US008795063B2

(12) United States Patent
Caputo et al.

(10) Patent No.: US 8,795,063 B2
(45) Date of Patent: Aug. 5, 2014

(54) GAMING SYSTEM, GAMING DEVICE, AND METHOD FOR PROVIDING A MULTIPLE PLAYER GAME

(75) Inventors: Scott A. Caputo, Santa Clara, CA (US); Bryan D. Wolf, Reno, NV (US)

(73) Assignee: IGT, Las Vegas, NV (US)

( * ) Notice: Subject to any disclaimer, the term of this patent is extended or adjusted under 35 U.S.C. 154(b) by 305 days.

(21) Appl. No.: 13/430,934

(22) Filed: Mar. 27, 2012

(65) Prior Publication Data

US 2013/0260868 A1 Oct. 3, 2013

(51) Int. Cl.
*A63F 13/00* (2014.01)

(52) U.S. Cl.
USPC .......... 463/25

(58) Field of Classification Search
CPC .......... G07F 17/3262; G07F 17/3272; G07F 17/3276; G07F 17/3279; A63F 2300/306
USPC .......... 463/15, 20, 25
See application file for complete search history.

(56) References Cited

U.S. PATENT DOCUMENTS

| | | | |
|---|---|---|---|
| 3,167,313 | A | 1/1965 | Davenport et al. |
| 3,281,149 | A | 10/1966 | Miller |
| 4,003,578 | A | 1/1977 | Jones |
| 4,103,895 | A | 8/1978 | Pressman et al. |
| 4,182,515 | A | 1/1980 | Nemeth |
| 4,277,067 | A | 7/1981 | Gettleman |
| 4,323,242 | A | 4/1982 | Rosenfeld |
| 4,339,798 | A | 7/1982 | Hedges et al. |
| 4,511,143 | A | 4/1985 | Sankrithi |
| 4,624,459 | A | 11/1986 | Kaufman |
| 4,669,731 | A | 6/1987 | Clarke |
| 4,695,053 | A | 9/1987 | Vazquez, Jr. et al. |
| 4,743,024 | A | 5/1988 | Helm et al. |
| 4,775,155 | A | 10/1988 | Lees |
| 4,805,907 | A | 2/1989 | Hagiwara |
| 4,836,546 | A | 6/1989 | DiRe et al. |
| 4,837,728 | A | 6/1989 | Barrie et al. |
| 4,850,592 | A | 7/1989 | Winter |
| 4,856,787 | A | 8/1989 | Itkis |
| 4,906,005 | A | 3/1990 | Manabe |
| 4,991,848 | A | 2/1991 | Greenwood et al. |
| 5,083,271 | A | 1/1992 | Thacher et al. |
| 5,083,800 | A | 1/1992 | Lockton |
| 5,092,598 | A | 3/1992 | Kamille |

(Continued)

FOREIGN PATENT DOCUMENTS

| | | |
|---|---|---|
| EP | 0449433 | 10/1991 |
| EP | 0464935 | 1/1992 |

(Continued)

*Primary Examiner* — Arthur O Hall
*Assistant Examiner* — Allen Chan
(74) *Attorney, Agent, or Firm* — Neal, Gerber & Eisenberg LLP

(57) ABSTRACT

A gaming system including a multiple player game, such as a community game associated with a plurality of gaming devices. This community game includes a community game area or matrix, such as a redemption area or redemption environment which is displayed to at least the players of the gaming devices. The community game matrix includes a plurality of displayed positions, spots or spaces. At least each of the players playing the primary games of the gaming devices of the gaming system are associated with a displayed participant or avatar that occupies or is otherwise positioned at one of the displayed positions, spots or spaces of the community game matrix.

28 Claims, 8 Drawing Sheets

(56) References Cited

U.S. PATENT DOCUMENTS

| | | | |
|---|---|---|---|
| 5,152,529 | A | 10/1992 | Okada |
| 5,178,390 | A | 1/1993 | Okada |
| 5,178,395 | A | 1/1993 | Lovell |
| 5,186,460 | A | 2/1993 | Fongeallaz et al. |
| 5,205,555 | A | 4/1993 | Hamann |
| 5,242,163 | A | 9/1993 | Fulton |
| 5,259,616 | A | 11/1993 | Bergmann |
| 5,275,400 | A | 1/1994 | Weingardt et al. |
| 5,299,810 | A | 4/1994 | Pierce et al. |
| 5,324,041 | A | 6/1994 | Boylan et al. |
| 5,332,219 | A | 7/1994 | Marnell, II et al. |
| 5,333,868 | A | 8/1994 | Goldfarb |
| 5,342,047 | A | 8/1994 | Heidel et al. |
| 5,355,442 | A | 10/1994 | Paglieroni et al. |
| 5,393,057 | A | 2/1995 | Marnell, II |
| 5,411,271 | A | 5/1995 | Mirando |
| 5,449,173 | A | 9/1995 | Thomas et al. |
| 5,456,465 | A | 10/1995 | Durham |
| 5,472,196 | A | 12/1995 | Rusnak |
| 5,486,005 | A | 1/1996 | Neal |
| 5,536,016 | A | 7/1996 | Thompson |
| 5,560,603 | A | 10/1996 | Seelig et al. |
| 5,564,700 | A | 10/1996 | Celona |
| 5,564,701 | A | 10/1996 | Dettor |
| 5,566,942 | A | 10/1996 | Elum |
| 5,569,083 | A | 10/1996 | Fioretti |
| 5,580,309 | A | 12/1996 | Piechowiak et al. |
| 5,611,730 | A | 3/1997 | Weiss |
| 5,630,753 | A | 5/1997 | Fuchs |
| 5,639,089 | A | 6/1997 | Matsumoto et al. |
| 5,645,486 | A | 7/1997 | Nagao et al. |
| 5,647,798 | A | 7/1997 | Falciglia |
| 5,655,961 | A | 8/1997 | Acres et al. |
| 5,664,998 | A | 9/1997 | Seelig et al. |
| 5,722,891 | A | 3/1998 | Inoue |
| 5,741,183 | A | 4/1998 | Acres et al. |
| 5,752,882 | A | 5/1998 | Acres et al. |
| 5,755,619 | A | 5/1998 | Matsumoto et al. |
| 5,758,875 | A | 6/1998 | Giacalone, Jr. |
| 5,761,647 | A | 6/1998 | Boushy |
| 5,769,716 | A | 6/1998 | Saffari et al. |
| 5,772,509 | A | 6/1998 | Weiss |
| 5,779,242 | A | 7/1998 | Kaufmann |
| 5,779,544 | A | 7/1998 | Seelig et al. |
| 5,779,549 | A | 7/1998 | Walker et al. |
| 5,788,573 | A | 8/1998 | Baerlocher et al. |
| 5,796,716 | A | 8/1998 | Smith |
| 5,813,672 | A | 9/1998 | Loud, Jr. |
| 5,820,459 | A | 10/1998 | Acres et al. |
| 5,823,874 | A | 10/1998 | Adams |
| 5,833,536 | A | 11/1998 | Davids et al. |
| 5,833,537 | A | 11/1998 | Barrie |
| 5,836,817 | A | 11/1998 | Acres et al. |
| 5,836,818 | A | 11/1998 | Jones et al. |
| 5,848,932 | A | 12/1998 | Adams |
| 5,851,148 | A | 12/1998 | Brune et al. |
| D404,436 | S | 1/1999 | McGahn et al. |
| 5,855,514 | A | 1/1999 | Kamille |
| 5,855,515 | A | 1/1999 | Pease et al. |
| 5,873,781 | A | 2/1999 | Keane |
| 5,876,284 | A | 3/1999 | Acres et al. |
| 5,882,261 | A | 3/1999 | Adams |
| 5,902,983 | A | 5/1999 | Crevelt et al. |
| 5,909,875 | A | 6/1999 | Weingardt |
| 5,911,418 | A | 6/1999 | Adams |
| 5,924,927 | A | 7/1999 | Matsuura et al. |
| 5,927,714 | A | 7/1999 | Kaplan |
| 5,934,999 | A | 8/1999 | Valdez |
| 5,935,002 | A | 8/1999 | Falciglia |
| 5,941,467 | A | 8/1999 | Kamille |
| 5,947,820 | A | 9/1999 | Morro et al. |
| 5,951,012 | A | 9/1999 | Feola |
| 5,951,397 | A | 9/1999 | Dickinson |
| 5,961,394 | A | 10/1999 | Robinson |
| 5,964,463 | A | 10/1999 | Moore, Jr. |
| 5,976,015 | A | 11/1999 | Seelig et al. |
| 5,980,384 | A | 11/1999 | Barrie |
| 5,984,781 | A | 11/1999 | Sunaga |
| 5,997,400 | A | 12/1999 | Seelig et al. |
| 5,997,401 | A | 12/1999 | Crawford |
| 6,004,207 | A | 12/1999 | Wilson, Jr. et al. |
| 6,012,982 | A | 1/2000 | Piechowiak et al. |
| 6,015,344 | A | 1/2000 | Kelly et al. |
| 6,015,346 | A | 1/2000 | Bennett |
| 6,019,369 | A | 2/2000 | Nakagawa et al. |
| 6,033,307 | A | 3/2000 | Vancura |
| 6,039,648 | A | 3/2000 | Guinn et al. |
| 6,048,269 | A | 4/2000 | Burns et al. |
| 6,050,895 | A | 4/2000 | Luciano, Jr. et al. |
| 6,059,289 | A | 5/2000 | Vancura |
| 6,059,658 | A | 5/2000 | Mangano et al. |
| 6,077,162 | A | 6/2000 | Weiss |
| 6,082,887 | A | 7/2000 | Feuer et al. |
| 6,089,976 | A | 7/2000 | Schneider et al. |
| 6,089,977 | A | 7/2000 | Bennett |
| 6,089,978 | A | 7/2000 | Adams |
| 6,089,980 | A | 7/2000 | Gauselmann |
| 6,093,102 | A | 7/2000 | Bennett |
| 6,102,400 | A | 8/2000 | Scott et al. |
| 6,102,798 | A | 8/2000 | Bennett |
| 6,110,043 | A | 8/2000 | Olsen |
| 6,113,098 | A | 9/2000 | Adams |
| 6,117,009 | A | 9/2000 | Yoseloff |
| 6,120,031 | A | 9/2000 | Adams |
| 6,120,377 | A | 9/2000 | McGinnis, Sr. et al. |
| 6,123,335 | A | 9/2000 | Adkins |
| 6,126,542 | A | 10/2000 | Fier |
| 6,126,547 | A | 10/2000 | Ishimoto |
| 6,134,556 | A | 10/2000 | Shin |
| 6,135,884 | A | 10/2000 | Hendrick et al. |
| 6,135,885 | A | 10/2000 | Lermusiaux |
| 6,142,872 | A | 11/2000 | Walker et al. |
| 6,142,873 | A | 11/2000 | Weiss et al. |
| 6,146,273 | A | 11/2000 | Olsen |
| 6,149,521 | A | 11/2000 | Sanduski |
| 6,155,925 | A | 12/2000 | Giobbi et al. |
| 6,159,095 | A | 12/2000 | Frohm et al. |
| 6,159,097 | A | 12/2000 | Gura |
| 6,159,098 | A | 12/2000 | Slomiany et al. |
| 6,162,121 | A | 12/2000 | Morro et al. |
| 6,164,652 | A | 12/2000 | Lauretta et al. |
| 6,165,071 | A | 12/2000 | Weiss |
| 6,165,072 | A | 12/2000 | Davis et al. |
| 6,168,520 | B1 | 1/2001 | Baerlocher et al. |
| 6,168,521 | B1 | 1/2001 | Luciano et al. |
| 6,168,523 | B1 | 1/2001 | Piechowiak et al. |
| 6,173,955 | B1 | 1/2001 | Perrie et al. |
| 6,174,235 | B1 | 1/2001 | Walker et al. |
| 6,186,894 | B1 | 2/2001 | Mayeroff |
| 6,190,255 | B1 | 2/2001 | Thomas et al. |
| 6,203,010 | B1 | 3/2001 | Jorasch et al. |
| 6,203,429 | B1 | 3/2001 | Demar et al. |
| 6,206,782 | B1 | 3/2001 | Walker et al. |
| 6,210,275 | B1 | 4/2001 | Olsen |
| 6,210,277 | B1 | 4/2001 | Stefan |
| 6,213,876 | B1 | 4/2001 | Moore, Jr. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,224,486 | B1 | 5/2001 | Walker et al. |
| 6,231,442 | B1 | 5/2001 | Mayeroff |
| 6,231,445 | B1 | 5/2001 | Acres |
| 6,254,481 | B1 | 7/2001 | Jaffe |
| 6,261,177 | B1 | 7/2001 | Bennett |
| 6,270,409 | B1 | 8/2001 | Shuster |
| 6,273,420 | B1 | 8/2001 | Brooks |
| 6,287,202 | B1 | 9/2001 | Pascal et al. |
| 6,290,600 | B1 | 9/2001 | Glasson |
| 6,299,165 | B1 | 10/2001 | Nagano |
| 6,309,299 | B1 | 10/2001 | Weiss |
| 6,309,300 | B1 | 10/2001 | Glavich |
| 6,309,307 | B1 | 10/2001 | Krause et al. |
| 6,312,332 | B1 | 11/2001 | Walker et al. |
| 6,312,334 | B1 | 11/2001 | Yoseloff |

(56) References Cited

U.S. PATENT DOCUMENTS

| | | | |
|---|---|---|---|
| 6,315,660 | B1 | 11/2001 | DeMar et al. |
| 6,315,664 | B1 | 11/2001 | Baerlocher et al. |
| 6,319,124 | B1 | 11/2001 | Baerlocher et al. |
| 6,319,125 | B1 | 11/2001 | Acres |
| 6,328,649 | B1 | 12/2001 | Randall et al. |
| 6,338,678 | B1 | 1/2002 | Seelig et al. |
| 6,346,043 | B1 | 2/2002 | Collin et al. |
| 6,347,996 | B1 | 2/2002 | Gilmore et al. |
| 6,364,767 | B1 | 4/2002 | Brossard et al. |
| 6,368,216 | B1 | 4/2002 | Hedrick et al. |
| 6,398,644 | B1 | 6/2002 | Perrie et al. |
| 6,406,369 | B1 | 6/2002 | Baerlocher et al. |
| 6,425,824 | B1 | 7/2002 | Baerlocher et al. |
| 6,439,995 | B1 | 8/2002 | Hughs-Baird et al. |
| 6,443,837 | B1 | 9/2002 | Jaffe et al. |
| 6,450,883 | B1 | 9/2002 | O'Halloran |
| 6,461,241 | B1 | 10/2002 | Webb et al. |
| 6,494,785 | B1 | 12/2002 | Gerrard et al. |
| 6,508,709 | B1 | 1/2003 | Karmarkar |
| 6,511,375 | B1 | 1/2003 | Kaminkow |
| 6,514,141 | B1 | 2/2003 | Kaminkow et al. |
| 6,533,273 | B2 | 3/2003 | Cole et al. |
| 6,558,254 | B2 | 5/2003 | Baerlocher et al. |
| 6,572,469 | B2 | 6/2003 | Klitsner et al. |
| 6,572,473 | B1 | 6/2003 | Baerlocher |
| 6,582,307 | B2 | 6/2003 | Webb |
| 6,589,117 | B1 | 7/2003 | Moritome et al. |
| 6,592,457 | B1 | 7/2003 | Frohm et al. |
| 6,595,854 | B2 | 7/2003 | Hughs-Baird et al. |
| 6,599,185 | B1 | 7/2003 | Kaminkow et al. |
| 6,599,190 | B2 | 7/2003 | Osawa |
| 6,599,193 | B2 | 7/2003 | Baerlocher et al. |
| 6,602,136 | B1 | 8/2003 | Baerlocher et al. |
| 6,602,137 | B2 | 8/2003 | Kaminkow et al. |
| 6,605,001 | B1 | 8/2003 | Tarantino |
| 6,607,438 | B2 | 8/2003 | Baerlocher et al. |
| 6,612,574 | B1 | 9/2003 | Cole et al. |
| 6,612,575 | B1 | 9/2003 | Cole et al. |
| 6,632,139 | B1 | 10/2003 | Baerlocher |
| 6,632,141 | B2 | 10/2003 | Webb et al. |
| 6,638,164 | B2 | 10/2003 | Randall et al. |
| 6,644,664 | B2 | 11/2003 | Muir et al. |
| 6,645,071 | B2 | 11/2003 | Perrie et al. |
| 6,652,378 | B2 | 11/2003 | Cannon et al. |
| 6,656,040 | B1 | 12/2003 | Brossman et al. |
| 6,676,516 | B2 | 1/2004 | Baerlocher et al. |
| 6,676,521 | B1 | 1/2004 | La Mura et al. |
| 6,688,975 | B2 | 2/2004 | Baerlocher et al. |
| 6,688,977 | B1 | 2/2004 | Baerlocher et al. |
| 6,692,356 | B2 | 2/2004 | Baerlocher et al. |
| 6,722,976 | B2 | 4/2004 | Adams |
| 6,722,981 | B2 | 4/2004 | Kaminkow et al. |
| 6,722,982 | B2 | 4/2004 | Kaminkow et al. |
| 6,722,983 | B2 | 4/2004 | Kaminkow et al. |
| 6,726,565 | B2 | 4/2004 | Hughs-Baird |
| 6,733,386 | B2 | 5/2004 | Cuddy et al. |
| 6,743,096 | B2 | 6/2004 | Allendorf et al. |
| 6,749,504 | B2 | 6/2004 | Hughs-Baird |
| 6,758,747 | B2 | 7/2004 | Baerlocher |
| 6,769,983 | B2 | 8/2004 | Slomiany |
| 6,780,107 | B2 | 8/2004 | Baerlocher et al. |
| 6,780,110 | B2 | 8/2004 | Baerlocher et al. |
| 6,780,111 | B2 | 8/2004 | Cannon et al. |
| 6,783,457 | B2 | 8/2004 | Hughs-Baird et al. |
| 6,793,578 | B2 | 9/2004 | Luccesi et al. |
| 6,796,899 | B2 | 9/2004 | Baerlocher et al. |
| 6,800,026 | B2 | 10/2004 | Cannon |
| 6,814,664 | B2 | 11/2004 | Baerlocher et al. |
| 6,817,944 | B2 | 11/2004 | Kaminkow et al. |
| 6,837,793 | B2 | 1/2005 | McClintic |
| 6,840,856 | B2 | 1/2005 | Stern |
| 6,843,722 | B2 | 1/2005 | Webb |
| 6,863,606 | B1 | 3/2005 | Berg et al. |
| 6,866,584 | B2 | 3/2005 | Michaelson |
| 6,875,108 | B1 | 4/2005 | Hughs-Baird |
| 6,880,168 | B2 | 4/2005 | Maehiro |
| 6,887,154 | B1 | 5/2005 | Luciano, Jr. et al. |
| 6,890,255 | B2 | 5/2005 | Jarvis et al. |
| 6,899,620 | B2 | 5/2005 | Kaminkown et al. |
| 6,902,478 | B2 | 6/2005 | McClintic |
| 6,905,406 | B2 | 6/2005 | Kaminkow et al. |
| 6,913,533 | B2 | 7/2005 | Cuddy et al. |
| 6,918,830 | B2 | 7/2005 | Baerlocher |
| 6,932,701 | B2 | 8/2005 | Glavich et al. |
| 6,939,224 | B2 | 9/2005 | Palmer et al. |
| 6,958,013 | B2 | 10/2005 | Miereau et al. |
| 6,966,833 | B2 | 11/2005 | Kaminkow et al. |
| 6,966,834 | B1 | 11/2005 | Johnson |
| 6,971,954 | B2 | 12/2005 | Randall et al. |
| 6,988,946 | B2 | 1/2006 | Michaleson |
| 6,988,948 | B2 | 1/2006 | Perrie et al. |
| 6,995,751 | B2 | 2/2006 | Falvo |
| 6,996,833 | B1 | 2/2006 | Olson et al. |
| 7,011,581 | B2 | 3/2006 | Cole et al. |
| 7,029,395 | B1 | 4/2006 | Baerlocher |
| 7,037,191 | B2 | 5/2006 | Rodgers et al. |
| 7,037,192 | B2 | 5/2006 | Baerlocher et al. |
| 7,040,984 | B2 | 5/2006 | Mead |
| 7,056,214 | B2 | 6/2006 | Miereau et al. |
| 7,077,744 | B2 | 7/2006 | Cannon |
| 7,081,050 | B2 | 7/2006 | Tarantino |
| 7,104,888 | B2 | 9/2006 | Miereau et al. |
| 7,112,137 | B2 | 9/2006 | Baerlocher et al. |
| 7,121,942 | B2 | 10/2006 | Baerlocher |
| 7,158,798 | B2 | 1/2007 | Lee et al. |
| 7,160,186 | B2 | 1/2007 | Cuddy et al. |
| 7,160,188 | B2 | 1/2007 | Kaminkow et al. |
| 7,160,190 | B2 | 1/2007 | Baerlocher et al. |
| 7,169,041 | B2 | 1/2007 | Tessmer et al. |
| 7,169,042 | B2 | 1/2007 | Muir et al. |
| 7,169,044 | B2 | 1/2007 | Baerlocher et al. |
| 7,172,506 | B2 | 2/2007 | Baerlocher et al. |
| 7,175,523 | B2 | 2/2007 | Gilmore et al. |
| 7,182,689 | B2 | 2/2007 | Hughs-Baird et al. |
| 7,192,348 | B2 | 3/2007 | Brosnan |
| 7,198,570 | B2 | 4/2007 | Rodgers et al. |
| 7,201,657 | B2 | 4/2007 | Baerlocher et al. |
| 7,223,172 | B2 | 5/2007 | Baerlocher et al. |
| 7,235,011 | B2 | 6/2007 | Randall et al. |
| 7,240,093 | B1 | 7/2007 | Danieli et al. |
| 7,257,714 | B1 | 8/2007 | Shen |
| 7,264,545 | B2 | 9/2007 | Maya et al. |
| 7,291,069 | B2 | 11/2007 | Michaelson et al. |
| 7,300,348 | B2 | 11/2007 | Kaminkow et al. |
| 7,303,469 | B2 | 12/2007 | Kaminkow et al. |
| 7,311,598 | B2 | 12/2007 | Kaminkow et al. |
| 7,311,604 | B2 | 12/2007 | Kaminkow et al. |
| 7,311,608 | B1 | 12/2007 | Danieli et al. |
| 7,314,408 | B2 | 1/2008 | Cannon |
| 7,314,409 | B2 | 1/2008 | Maya et al. |
| 7,314,410 | B2 | 1/2008 | Baerlocher et al. |
| 7,318,773 | B2 | 1/2008 | Baerlocher |
| 7,326,115 | B2 | 2/2008 | Baerlocher |
| 7,331,865 | B2 | 2/2008 | Baerlocher et al. |
| 7,338,367 | B2 | 3/2008 | Kaminkow et al. |
| 7,338,369 | B2 | 3/2008 | Mierau et al. |
| 7,351,140 | B2 | 4/2008 | Wolf et al. |
| 7,361,087 | B2 | 4/2008 | Baerlocher et al. |
| 7,393,280 | B2 | 7/2008 | Cannon |
| 7,422,213 | B2 | 9/2008 | Katz et al. |
| 7,427,236 | B2 | 9/2008 | Kaminkow et al. |
| 7,448,949 | B2 | 11/2008 | Kaminkow et al. |
| 8,070,587 | B2 | 12/2011 | Davis et al. |
| 2001/0004607 | A1 | 6/2001 | Olsen |
| 2001/0016513 | A1 | 8/2001 | Muir et al. |
| 2002/0016200 | A1 | 2/2002 | Baerlocher et al. |
| 2002/0039923 | A1 | 4/2002 | Cannon et al. |
| 2002/0052232 | A1 | 5/2002 | Kaminkow |
| 2002/0055381 | A1 | 5/2002 | Tarantino |
| 2002/0128055 | A1 | 9/2002 | Adams |
| 2002/0137560 | A1 | 9/2002 | DeMar et al. |
| 2002/0177483 | A1 | 11/2002 | Cannon |
| 2003/0013514 | A1 | 1/2003 | Cregan et al. |
| 2003/0036422 | A1 | 2/2003 | Baerlocher et al. |

(56) References Cited

U.S. PATENT DOCUMENTS

| | | | |
|---|---|---|---|
| 2003/0036424 | A1 | 2/2003 | Baerlocher |
| 2003/0040358 | A1 | 2/2003 | Rothkranz et al. |
| 2003/0054871 | A1 | 3/2003 | Baerlocher |
| 2003/0060259 | A1 | 3/2003 | Mierau et al. |
| 2003/0060264 | A1 | 3/2003 | Chilton et al. |
| 2003/0064773 | A1 | 4/2003 | Baerlocher et al. |
| 2003/0064779 | A1 | 4/2003 | Suda |
| 2003/0064796 | A1 | 4/2003 | Glavich et al. |
| 2003/0069057 | A1 | 4/2003 | DeFrees-Parrott |
| 2003/0078091 | A1 | 4/2003 | Brandstetter et al. |
| 2003/0078096 | A1 | 4/2003 | Kaminkow et al. |
| 2003/0104853 | A1 | 6/2003 | Tessmer et al. |
| 2003/0114220 | A1 | 6/2003 | McClintic |
| 2003/0119581 | A1 | 6/2003 | Cannon et al. |
| 2003/0125107 | A1 | 7/2003 | Cannon |
| 2003/0127793 | A1 | 7/2003 | Adams |
| 2003/0153378 | A1 | 8/2003 | Schlegel et al. |
| 2003/0157982 | A1 | 8/2003 | Gerrard et al. |
| 2003/0162578 | A1 | 8/2003 | Baerlocher et al. |
| 2004/0033831 | A1 | 2/2004 | Tarantino |
| 2004/0048644 | A1 | 3/2004 | Gerrard et al. |
| 2004/0048649 | A1 | 3/2004 | Peterson et al. |
| 2004/0053665 | A1 | 3/2004 | Baerlocher |
| 2004/0082373 | A1 | 4/2004 | Cole et al. |
| 2004/0111358 | A1 | 6/2004 | Lange et al. |
| 2004/0152520 | A1 | 8/2004 | Shinoda |
| 2004/0166923 | A1 | 8/2004 | Michaelson et al. |
| 2004/0224770 | A1 | 11/2004 | Wolf et al. |
| 2004/0229671 | A1 | 11/2004 | Stronach et al. |
| 2004/0242315 | A1 | 12/2004 | Paulsen et al. |
| 2004/0248639 | A1 | 12/2004 | Slomiany |
| 2005/0020340 | A1 | 1/2005 | Cannon |
| 2005/0020351 | A1 | 1/2005 | Baerlocher et al. |
| 2005/0020352 | A1 | 1/2005 | Chilton et al. |
| 2005/0026679 | A1 | 2/2005 | Lucchesi et al. |
| 2005/0026687 | A1 | 2/2005 | Watanabe |
| 2005/0033461 | A1 | 2/2005 | Gerrard et al. |
| 2005/0054404 | A1 | 3/2005 | Baerlocher |
| 2005/0054405 | A1 | 3/2005 | Baerlocher et al. |
| 2005/0054415 | A1 | 3/2005 | Kaminkow et al. |
| 2005/0054416 | A1 | 3/2005 | Hostetler et al. |
| 2005/0054435 | A1 | 3/2005 | Rodgers et al. |
| 2005/0059456 | A1 | 3/2005 | Mead et al. |
| 2005/0059461 | A1 | 3/2005 | Ching et al. |
| 2005/0064928 | A1 | 3/2005 | Baerlocher et al. |
| 2005/0096123 | A1 | 5/2005 | Cregan et al. |
| 2005/0101372 | A1 | 5/2005 | Mierau et al. |
| 2005/0137014 | A1 | 6/2005 | Vetelainen |
| 2005/0181860 | A1 | 8/2005 | Nguyen et al. |
| 2005/0192081 | A1 | 9/2005 | Marks et al. |
| 2005/0197180 | A1 | 9/2005 | Kaminkow et al. |
| 2005/0202875 | A1 | 9/2005 | Murphy et al. |
| 2005/0218591 | A1 | 10/2005 | Torigian et al. |
| 2005/0227754 | A1 | 10/2005 | Kaminkow et al. |
| 2006/0025195 | A1 | 2/2006 | Pennington et al. |
| 2006/0030401 | A1 | 2/2006 | Mead et al. |
| 2006/0030959 | A1 | 2/2006 | Duhamel |
| 2006/0035696 | A1 | 2/2006 | Walker et al. |
| 2006/0040732 | A1 | 2/2006 | Baerlocher et al. |
| 2006/0046821 | A1 | 3/2006 | Kaminkow et al. |
| 2006/0046822 | A1 | 3/2006 | Kaminkow et al. |
| 2006/0068882 | A1 | 3/2006 | Baerlocher et al. |
| 2006/0068893 | A1 | 3/2006 | Jaffe et al. |
| 2006/0073874 | A1 | 4/2006 | Cregan et al. |
| 2006/0079317 | A1 | 4/2006 | Flemming et al. |
| 2006/0084500 | A1 | 4/2006 | Baerlocher et al. |
| 2006/0089194 | A1 | 4/2006 | Joshi et al. |
| 2006/0111170 | A1 | 5/2006 | Hornik et al. |
| 2006/0121971 | A1 | 6/2006 | Slomiany et al. |
| 2006/0157934 | A1 | 7/2006 | Yoseloff et al. |
| 2006/0183528 | A1 | 8/2006 | Rodgers et al. |
| 2006/0199628 | A1 | 9/2006 | Rodgers et al. |
| 2006/0217170 | A1 | 9/2006 | Roireau |
| 2006/0217183 | A1 | 9/2006 | Mierau et al. |
| 2006/0246977 | A1 | 11/2006 | Cannon |
| 2006/0247011 | A1 | 11/2006 | Gagner |
| 2006/0287057 | A1 | 12/2006 | Osawa |
| 2007/0015566 | A1 | 1/2007 | Baerlocher et al. |
| 2007/0015585 | A1 | 1/2007 | Sartini |
| 2007/0032285 | A1 | 2/2007 | Wolf |
| 2007/0054732 | A1 | 3/2007 | Baerlocher |
| 2007/0054733 | A1 | 3/2007 | Baerlocher |
| 2007/0060271 | A1 | 3/2007 | Cregan et al. |
| 2007/0060300 | A1 | 3/2007 | Baerlocher |
| 2007/0077990 | A1 | 4/2007 | Cuddy et al. |
| 2007/0077997 | A1 | 4/2007 | Johnson |
| 2007/0087809 | A1 | 4/2007 | Baerlocher |
| 2007/0105620 | A1 | 5/2007 | Cuddy et al. |
| 2007/0111783 | A1 | 5/2007 | Cuddy et al. |
| 2007/0117606 | A1 | 5/2007 | Baerlocher et al. |
| 2007/0117608 | A1 | 5/2007 | Roper et al. |
| 2007/0123353 | A1 | 5/2007 | Smith |
| 2007/0129131 | A1 | 6/2007 | Kaminkow et al. |
| 2007/0149269 | A1 | 6/2007 | Benbrahim |
| 2007/0155485 | A1 | 7/2007 | Cuddy et al. |
| 2007/0167211 | A1 | 7/2007 | Rodgers et al. |
| 2007/0167217 | A1 | 7/2007 | Kaminkow et al. |
| 2007/0173325 | A1 | 7/2007 | Shaw et al. |
| 2007/0184896 | A1 | 8/2007 | Dickerson |
| 2007/0218997 | A1 | 9/2007 | Cho |
| 2007/0243936 | A1 | 10/2007 | Binenstock et al. |
| 2007/0259713 | A1 | 11/2007 | Fiden et al. |
| 2007/0265060 | A1 | 11/2007 | Hornik et al. |
| 2007/0298858 | A1 | 12/2007 | Toneguzzo |
| 2007/0298874 | A1 | 12/2007 | Baerlocher et al. |
| 2007/0298875 | A1 | 12/2007 | Baerlocher et al. |
| 2008/0004102 | A1 | 1/2008 | Kojima |
| 2008/0020822 | A1 | 1/2008 | Cuddy et al. |
| 2008/0020846 | A1 | 1/2008 | Vasquez |
| 2008/0064502 | A1 | 3/2008 | Schlottmann et al. |
| 2008/0076514 | A1 | 3/2008 | Baerlocher et al. |
| 2008/0076515 | A1 | 3/2008 | Baerlocher et al. |
| 2008/0076517 | A1 | 3/2008 | Baerlocher et al. |
| 2008/0076552 | A1 | 3/2008 | Baerlocher et al. |
| 2008/0102916 | A1 | 5/2008 | Kovacs et al. |
| 2008/0108404 | A1 | 5/2008 | Iddings et al. |
| 2008/0108429 | A1 | 5/2008 | Davis et al. |
| 2008/0113735 | A1 | 5/2008 | Maya |
| 2008/0146322 | A1 | 6/2008 | Hardy et al. |
| 2008/0146323 | A1 | 6/2008 | Hardy et al. |
| 2008/0146345 | A1 | 6/2008 | Hardy et al. |
| 2008/0176650 | A1 | 7/2008 | Wolf et al. |
| 2008/0182662 | A1 | 7/2008 | Yoshizawa |
| 2008/0214310 | A1 | 9/2008 | Brunet De et al. |
| 2008/0227549 | A1 | 9/2008 | Itskov et al. |
| 2008/0227552 | A1 | 9/2008 | Shimomura et al. |
| 2008/0280670 | A1 | 11/2008 | Sakuma |
| 2009/0088244 | A1 | 4/2009 | Nicely et al. |
| 2009/0124327 | A1 | 5/2009 | Caputo et al. |
| 2010/0016065 | A1 | 1/2010 | Nicely et al. |
| 2010/0029363 | A1 | 2/2010 | Hoffman et al. |
| 2010/0048282 | A1 | 2/2010 | Nicely et al. |
| 2010/0120505 | A1 | 5/2010 | Caputo et al. |
| 2010/0120521 | A1 | 5/2010 | Caputo et al. |
| 2010/0216538 | A1 * | 8/2010 | Lind .............................. 463/19 |
| 2011/0111827 | A1 | 5/2011 | Nicely et al. |
| 2011/0117981 | A1 | 5/2011 | Baerlocher et al. |
| 2011/0201410 | A1 * | 8/2011 | Englman et al. ................ 463/25 |

FOREIGN PATENT DOCUMENTS

| | | |
|---|---|---|
| EP | 0688002 | 12/1995 |
| EP | 0874337 | 10/1998 |
| EP | 0926645 | 6/1999 |
| EP | 0944030 | 9/1999 |
| EP | 0945837 | 9/1999 |
| EP | 1063622 | 12/2000 |
| EP | 1199689 | 4/2002 |
| EP | 1298607 | 4/2003 |
| EP | 1531434 | 5/2005 |
| EP | 1764753 | 3/2007 |
| EP | 1779908 | 5/2007 |
| GB | 2066991 | 7/1981 |
| GB | 2072395 | 9/1981 |

(56) References Cited

FOREIGN PATENT DOCUMENTS

| | | |
|---|---|---|
| GB | 2084371 | 4/1982 |
| GB | 2096376 | 10/1982 |
| GB | 2137392 | 10/1984 |
| GB | 2144644 | 3/1985 |
| GB | 2161008 | 1/1986 |
| GB | 2170938 | 8/1986 |
| GB | 2182186 | 5/1987 |
| GB | 2191030 | 12/1987 |
| GB | 2201821 | 9/1988 |
| GB | 2202984 | 10/1988 |
| GB | 2222712 | 3/1990 |
| GB | 2226436 | 6/1990 |
| GB | 2242300 | 9/1991 |
| GB | 2322217 | 8/1998 |
| GB | 2328311 | 2/1999 |
| GB | 2333880 | 8/1999 |
| WO | WO9800210 | 1/1998 |
| WO | WO0012186 | 3/2000 |
| WO | WO0020082 | 4/2000 |
| WO | WO0043087 | 7/2000 |
| WO | WO02096528 | 12/2002 |
| WO | WO03010725 | 2/2003 |
| WO | WO03026757 | 4/2003 |
| WO | WO03049053 | 6/2003 |
| WO | WO03083796 | 10/2003 |
| WO | WO2005110570 | 11/2005 |
| WO | WO2006063054 | 6/2006 |
| WO | WO2007011502 | 1/2007 |
| WO | WO2007030641 | 3/2007 |
| WO | WO2007030733 | 3/2007 |
| WO | WO2007030801 | 3/2007 |
| WO | WO2007087078 | 8/2007 |
| WO | WO2008022323 | 2/2008 |
| WO | WO2008027062 | 3/2008 |
| WO | WO2008109987 | 9/2008 |

* cited by examiner

GAMING SYSTEM, GAMING DEVICE, AND METHOD FOR PROVIDING A MULTIPLE PLAYER GAME

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur usually provide higher awards. In such known gaming machines, the amount of the wager made on the base game by the player may vary.

Gaming machines which provide secondary or bonus games are also known. The secondary or bonus games usually provide an additional award, such as a bonus award, to the player. Secondary or bonus games usually do not require an additional wager by the player to be activated. Instead, secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machine generally indicates this triggering to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

Certain known gaming machines are configured such that the players of these gaming machines compete for one or more awards, such as progressive awards. Other known gaming machines are configured such that the players share with each other or can each win one or more awards. These awards are sometimes displayed by one or more secondary display devices above the bank or group of gaming machines. These types of group or community gaming systems (where the players are either competing for awards, where the players are sharing awards, or where the players are winning awards at the same time) continue to grow in popularity. Certain of these group or community gaming systems create an aura of excitement and entertainment for the people playing the gaming machines of the system and for people watching play.

There is a continuing need to increase this excitement and entertainment for people playing and people watching play of group or community gaming systems. There is also need for new ways of providing better gaming experiences at gaming machines. There is a further need for increasing social interactivity among people playing and people watching play of gaming machines which are or are not part of a group or community gaming system.

SUMMARY

The present disclosure relates generally to gaming systems, gaming devices, and methods for providing a multiple player game.

In various embodiments, the gaming system disclosed herein includes a multiple player game, such as a community game associated with a plurality of gaming devices. This community game includes a community game area or matrix, such as a redemption area or redemption environment which is displayed to at least the players of the gaming devices. The community game matrix includes a plurality of displayed positions, spots or spaces. At least each of the players playing the primary games of the gaming devices of the gaming system are associated with a displayed participant or avatar that occupies or is otherwise positioned at one of the displayed positions, spots or spaces of the community game matrix.

The gaming system of various embodiments enables each player at each gaming device to play one or more primary games. In association with the play of one or more primary games played by each individual player, the gaming system provides that individual player a quantity of position moves and/or a quantity of community game award populators. Each position move is associated with a move of the player's participant to another position of the community game matrix. Each community game award populator is associated with either an award (e.g., a value or a modifier) or an award opportunity (e.g., a play of one of a plurality of different games) which the player associates, links or otherwise couples with one of the positions of the community game matrix. In operation of these embodiments, based on the quantity of position moves provided to a player, the player moves their associated participant to one or more different displayed positions of the community game matrix. If a player moves their associated participant to a displayed position that is coupled with a community game award populator (such as by that player or another player previously placing a provided community game award populator at the moved-to position), the gaming system provides the player any award associated with the coupled community game award populator of the moved-to position or enables the player to participate in any award opportunity (to potentially win an award) associated with the coupled community game award populator of the moved-to position. Such a gaming system provides players with an interactive community game in which an individual player's decisions regarding which displayed positions to visit, determine, at least in part, one or more individual awards provided to the player. Such a gaming system further provides players with an interactive community game in which an individual player's decisions regarding which displayed positions to couple or associate with which community game award populators, determine, at least in part, one or more individual awards provided to that player or to other players.

More specifically, the gaming system of one embodiment disclosed herein includes a community game having at least one redemption area. Each redemption area includes a plurality of positions. These redemption areas and these positions are displayed to the players of the gaming devices (and the people watching the play of the community game) such that each player (or bystander) is aware or may become aware of any events currently occurring in the community game and/or any awards provided in association with the play of the community game.

In operation of this embodiment, each player (whether in a gaming establishment, online or elsewhere) playing a primary game at one of the gaming devices of the gaming system associated with the community game is associated with a participant or avatar. If a community game award populator event occurs in association with a player playing the primary game of one of the gaming devices, the gaming system provides the player a quantity or number of community game award populators to associate with one or more positions of the redemption area. In this embodiment, each provided community game award populator represents either an award or an award opportunity which the player places at a position of the redemption area. Such placement makes the award or award opportunity associated with the community game award populator available to either that player or another player playing the community game. Accordingly, the placement of one or more community game award populators in the redemption area (and thus the placement of one or more awards or award opportunities in the redemption area) at least partially involves an element of strategy by the player placing the community game award populators. For example, a player provided a community game award populator associated with a lucrative award opportunity may weigh the pros and cons of placing that community game award populator at a displayed position near the player's participant but also near the participant of another player.

In one such embodiment, to account for different players placing different wager amounts on the plays of the primary games of the gaming devices, the award or award opportunity associated with each provided community game award populator is based, at least in part, on the wager amount placed on the play of the primary game associated with the occurrence of the community game award populator event. In this embodiment, players that wager relatively higher amounts are provided community game award populators associated with relatively higher valued awards/award opportunities and thus such players populate the redemption area of the community game with such relatively higher valued awards/award opportunities for that player (or another player) to subsequently win.

In another such embodiment, different community game award populators correspond to different quantities of positions of the redemption area. In this embodiment, community game award populators that are associated with relatively higher valued awards/award opportunities correspond to a higher quantity of positions of the redemption area than community game award populators that are associated with relatively lower valued awards/award opportunities. Put differently, a community game award populator associated with a relatively higher valued award/award opportunity will take up more space when placed in the redemption area (i.e., occupy more positions) than a community game award populator associated with a relatively lower valued award/award opportunity. Such a configuration provides players with an interesting choice to either keep any open positions around their participant in hope of being able to place a larger sized community game award populator (associated with a relatively higher valued award/award opportunity) near their participant, or to fill up any open positions around their associated participant with a plurality of community game award populators associated with relatively lower valued awards/award opportunities.

In addition to providing the player a quantity of community game award populators to associate with one or more positions of the redemption area, if a community game position move accumulation event occurs in association with a player playing the primary game of one of the gaming devices, the gaming system provides the player a quantity or number of moves or turns to use or redeem throughout the redemption area. Each provided move enables the player to move the player's participant from a current position to another displayed position to access any award/award opportunity associated with that the moved-to position.

In various embodiments, for each move provided to the player, the gaming system enables the player to designate where they want to move their participant (i.e., pick a destination position). Since the player is provided a limited quantity of moves, which displayed position the player's participant may move to is based, at least in part, on the participant's current position in the redemption area and the quantity of moves provided. After enabling the player to designate where they want to move, the gaming system moves the player's participant to the designated position and determines if an award or an award opportunity is associated with the moved-to position. If no award or award opportunity is associated with the moved-to position (e.g., no community game award populator was previously placed at the moved-to position), the gaming system does not provide any award or award opportunity to the player for that moved-to position. On the other hand, if an award is associated with the moved-to position (e.g., a community game award populator associated with an award was previously placed at the player's participant's moved-to position), the gaming system provides the player the associated award. Additionally, if an award opportunity is associated with the moved-to position (e.g., a community game award populator associated with an award opportunity was previously placed at the player's participant's moved-to position), the gaming system provides the player an opportunity to win an award, such as enabling the player to play one of a plurality of different games of different volatilities.

It should be appreciated that compared to certain known community games in which each of the player's play toward a community or common goal to win a group award, the community game disclosed herein provides an element of competition amongst players as certain players compete to be the first player to move their associated participant to a designated position where a community game award populator associated with a lucrative award/award opportunity was previously placed. Compared to such known community games, the community game disclosed herein also enables each player to have an individual experience while playing a community game by enabling each player to play one or more individual games to determine an individual award for that player in association with a play of a community game. It should be further appreciated that causing one or more displayed positions to be associated with different games of different volatilities provides an increased amount of entertainment for the player as each player of the community game is enabled to select, based on the player's decisions on where to move their participant, an amount of volatility of their community game experience.

The gaming system and method of the present disclosure thus provides an community game in which each player is provided individual awards or plays individual games to determine any individual awards for that player. The gaming system and method of the present disclosure further provides an community game in which a player's decision regarding where to place one or more community game award populators (associated with one or more awards or award opportunities) determine any individual awards for that player and/or other players also playing the community game.

Additional features and advantages are described in, and will be apparent from, the following Detailed Description and the figures.

DETAILED DESCRIPTION

Multiple Player Bonus Game

Figure 1:
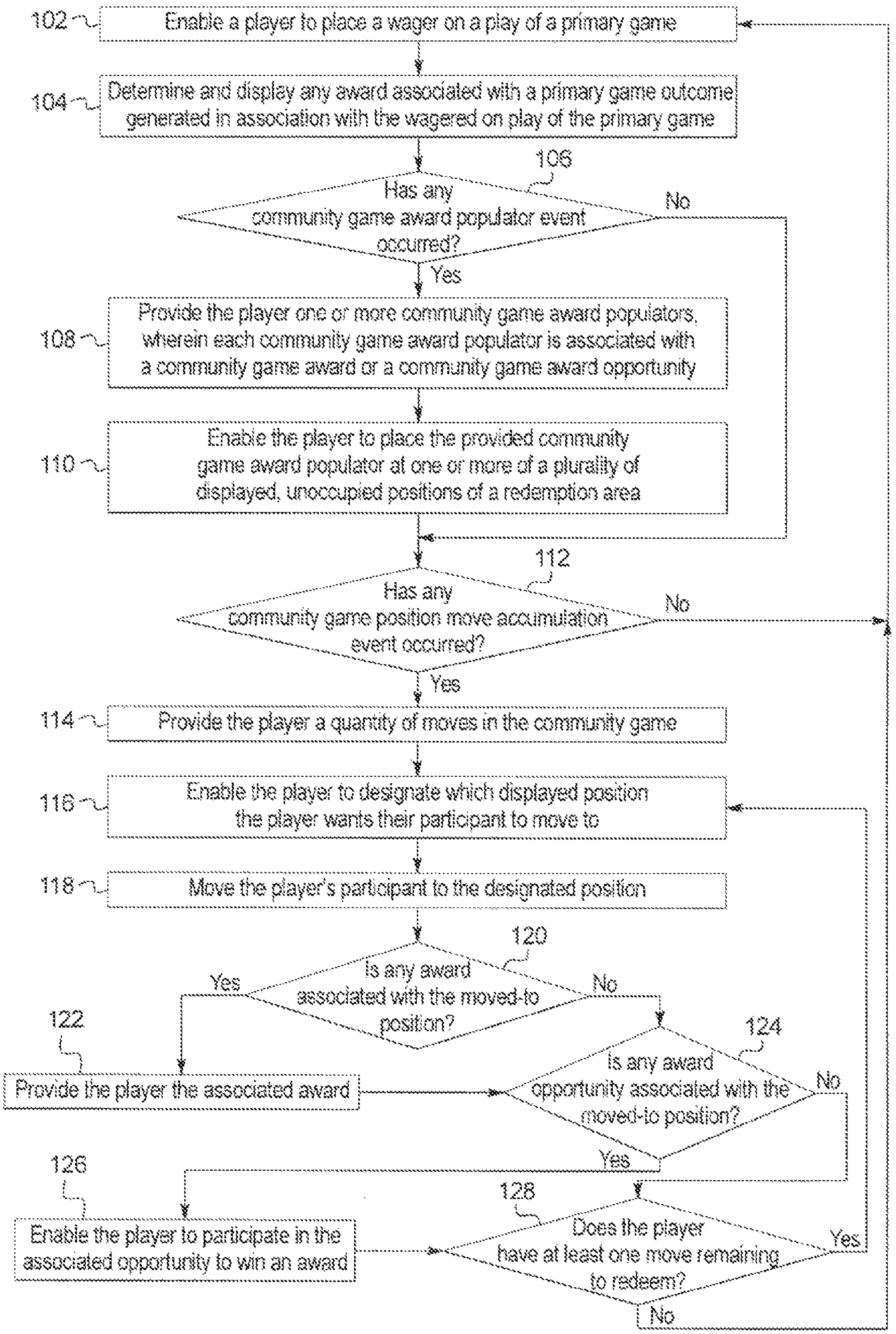
FIG. 1 is a flow chart an example process for operating a gaming system providing the community game disclosed herein.

Referring now to FIG. 1, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain steps described may be changed, or certain steps described may be optional.

As seen in FIG. 1, in one embodiment, as described in more detail below, the gaming system enables a player to place a wager on a play of a primary game as indicated in block 102 of FIG. 1. As also described in more detail below, the gaming system then determines and displays any award associated with a primary game outcome generated in association with the wagered on play of the primary game as indicted in block 104.

In addition to displaying the play of the primary game, the gaming system determines if a community game award populator event occurs as indicated in diamond 106. In one embodiment, a community game award populator event occurs based on a displayed event associated with the wagered on play of the primary game. In various embodiments, a generation of a designated symbol (or sub-symbol) or a designated set of symbols (or sub-symbols) over one or more plays of a primary game causes a community game award populator event to occur. In another embodiment, a community game award populator event occurs based on an event independent of any displayed event associated with the wagered on play of the primary game. For example, after a designated period of time, the gaming system causes a community game award populator event to occur.

If the community game award populator event occurs, the gaming system provides the player one or more community game award populators as indicated in block 108. Each community game award populator is associated with a community game award, such as an award value or an award multiplier or a community game award opportunity, such as a quantity of plays of a slot game or a quantity of plays of a selection game.

After providing the player one or more community game award populators, the gaming system enables the player to place the provided community game award populator at one or more of a plurality of displayed, unoccupied positions of a redemption area of the community game as indicated in block 110. Since each community game award populator is associated with an award or an award opportunity, the gaming system enables the player to place one or more awards and/or one or more award opportunities at one or more of the displayed positions. In this embodiment, such placement of a community game award populator at a displayed position of the redemption area causes the award/award opportunity associated with the placed community game award populator to become associated with that displayed position. This placement makes the award or award opportunity associated with the community game award populator available to either that player or another player playing the community game. Accordingly, the placement of one or more community game award populators in the redemption area (and thus the placement of one or more awards or award opportunities in the redemption area) at least partially involves an element of strategy by the player placing the community game award populators. For example, a player provided a community game award populator associated with a lucrative award opportunity may weigh the pros and cons of placing that community game award populator at a displayed position near the player's participant but also near the participant of another player.

Figure 2A:
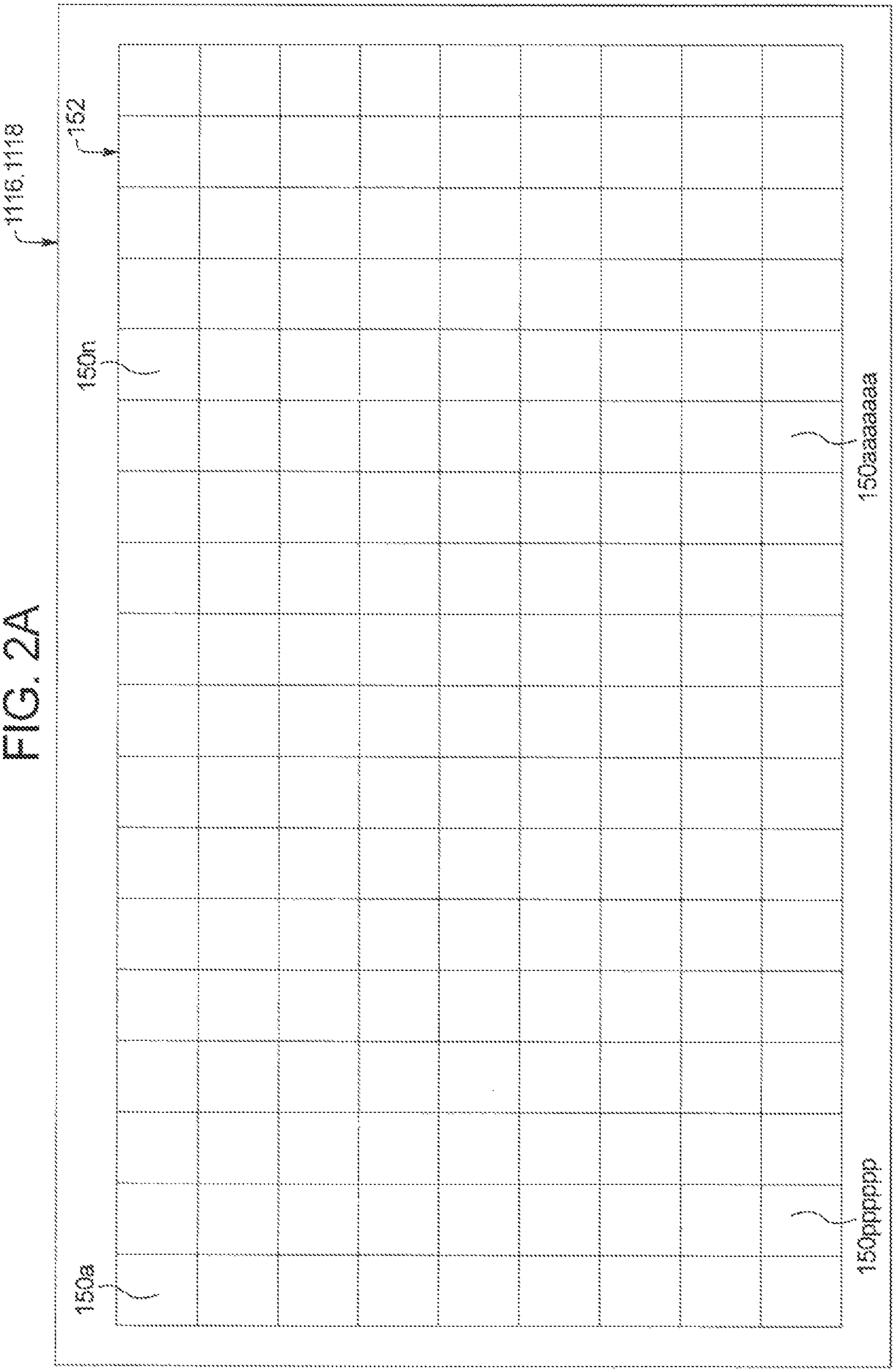
FIGS. 2A, 2B and 2C are front views of one embodiment of the gaming system disclosed herein illustrating a plurality of displayed positions of a redemption area of a community game and the placement of community game awards/award opportunities at such displayed positions.
Figure 2B:
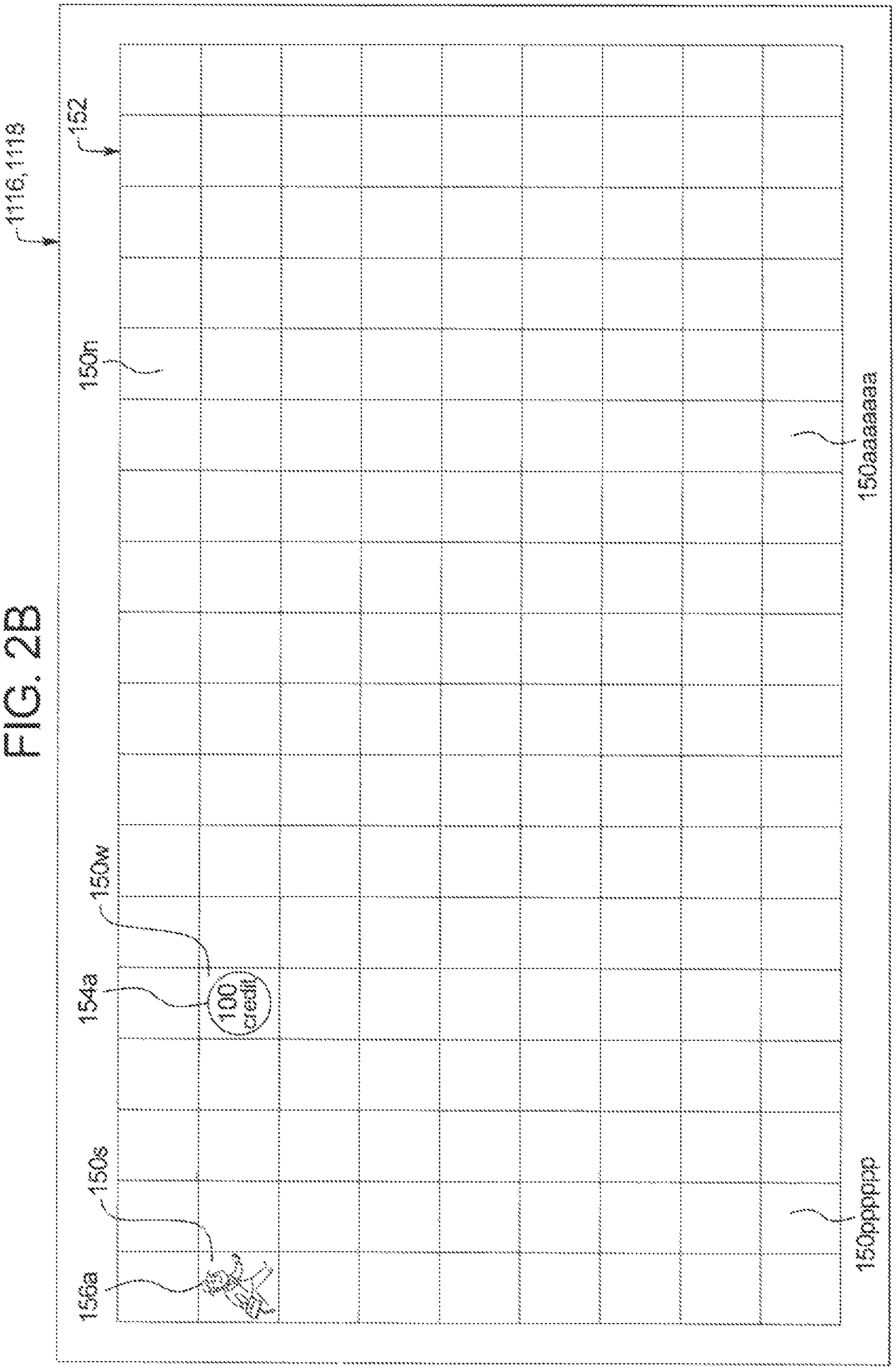
Figure 2C:
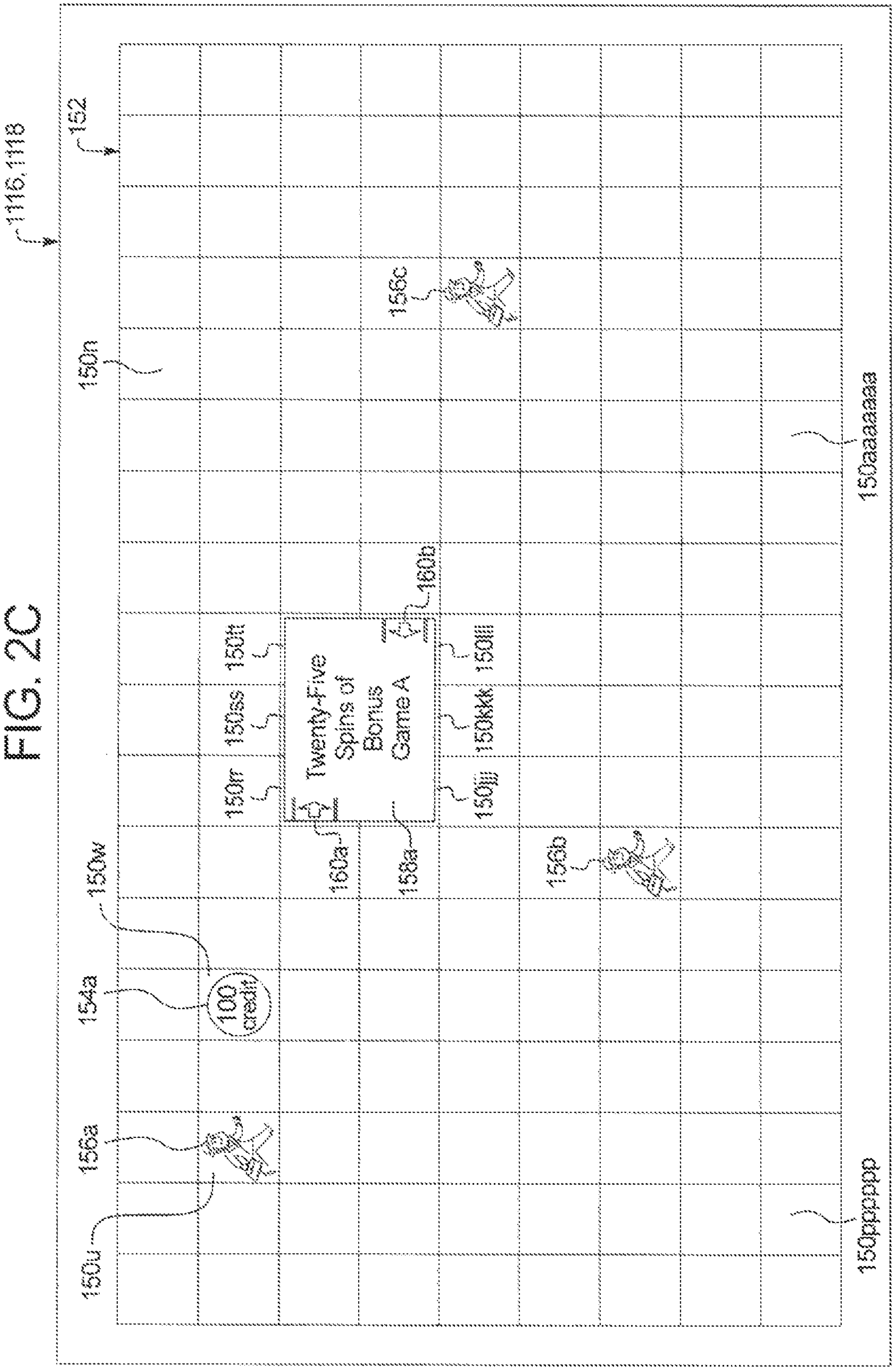

In one example embodiment, as seen in FIG. 2A, the community game includes a plurality of positions 150*a* to 150*ffffff* which form part or all of at least one redemption area 152. In this example embodiment, as seen in FIG. 2B, after providing the player one community game award populator associated with a community game award of one-hundred credits, the player placed the community game award populator at position 150*w* of the redemption area 152. Accordingly, position 150*w* is associated with a community game award of one-hundred credits (illustrated as a one-hundred credit coin 154*a*) which may be won by either the player (or another player). In this example, at a subsequent point in time upon a subsequent occurrence of a community game award populator event and the subsequent providing of a community game award populator associated with a community game award opportunity of twenty-free spins of a first game (having an average expected value of five-hundred credits), as seen in FIG. 2C, the player placed the community game award populator at positions 150*rr* to 150*tt* and positions 150*jjj* to 150*lll* of the redemption area 152. Accordingly, positions 150*rr* to 150*tt* and positions 150*jjj* to 150*lll* are associated with a community game award opportunity of twenty-five free spins of a first game (illustrated as a community game building 158*a* with entrances on two sides 160*a* and 160*b*) which may be won by either the player (or another player).

It should be appreciated that at different points in time, different quantities of participant are located within the redemption area. For example, as seen in FIG. 2A, prior to a first point in time when the first community game populator event occurred, no participants occupied any of the displayed positions of the redemption area. In this example, after the first community game populator event occurred (as seen in FIG. 2B), one participant 156*a* occupied one of the displayed positions of the redemption area and after a subsequent community game populator event occurred (as seen in FIG. 2C)

three participants 156*a*, 156*b* and 156*c* occupied three of the displayed positions of the redemption area.

It should be further appreciated that at different points in time, one or more participants are located at different displayed positions within the redemption area. That is, as described herein, the participants move and thus at different points in time, the same participant may have moved from one displayed position to another. For example, as seen in FIGS. 2B and 2C, from one point in time to another point in time, participant 156*a* moved from displayed position 150*s* to displayed position 150*u* (i.e., closer to the community game award placed at displayed position 150*w*).

In addition to displaying the play of the primary game and determining if any community game award populator events occur, the gaming system determines if a community game position move accumulation event occurs as indicated in block 112 of FIG. 1. In one embodiment, a community game position move accumulation event occurs based on a displayed event associated with the wagered on play of the primary game. In various embodiments, a generation of a designated symbol (or sub-symbol) or a designated set of symbols (or sub-symbols) over one or more plays of a primary game causes a community game position move accumulation event to occur. In another embodiment, a community game position move accumulation event occurs based on an event independent of any displayed event associated with the wagered on play of the primary game. For example, after a designated period of time, the gaming system causes a community game position move accumulation event to occur.

If no community game position move accumulation event occurred, the gaming system returns to block 102 and enables the player to continue making wagers on plays of the primary game as described above.

If the gaming system causes a community game position move accumulation event to occur, the gaming system provides or accumulates one or more moves of the player's participant within the redemption area of the community game as indicated in block 114. Each provided move or turn enables the player to move their associated participant from a current position to a different position that is adjacent to the current position. In an alternative embodiment, the gaming system enables each player to move their associated participant from a current position to a different position that is non-adjacent to the current position (i.e., the gaming system enables a player's participant to jump one or more positions). In one embodiment, the quantity of position moves accumulated is based on a displayed event associated with the wagered on play of the primary game. In another embodiment, the quantity of position moves accumulated is based on an event independent of any displayed event associated with the wagered on play of the primary game.

In one such embodiment, the gaming system causes community game award populator events to occur more frequently than community game position move accumulation events occur. In this embodiment, the displayed positions become associated with more and more community game awards/award opportunities (i.e., the redemption area becomes richer and richer), and there will be a race between players to move their participants to accumulate or collect such community game awards/award opportunities. In one another embodiment, the gaming system causes community game award populator events to occur less frequently than community game position move accumulation events occur. In another such embodiment, the gaming system causes community game award populator events to occur at the same frequency that community game position move accumulation events occur.

After providing the player a quantity of moves, for a first provided move, the gaming system enables the player to designate which displayed position the player wants their participant to move to as indicated in block 116. That is, the gaming system enables the player to pick a destination position for their participant. In this embodiment, the destination position or plurality of destination positions available for the player to select are based on the current position of the player's participant and the quantity of positions adjacent to the current position. For example, if a player's participant is currently located at a position with only one adjacent position, the gaming system enables the player to select this one adjacent position as the destination position for the player's participant to move to. In another example, if a player's participant is currently located at a position with three adjacent positions, the gaming system enables the player to select any of these three adjacent positions as the destination position for the player's participant to move to. In certain embodiments, the gaming system enables the player to utilize a provided position move to keep the player's participant to the participant's current position. In certain other embodiments, the gaming system requires the player to utilize a provided position move to move the player's participant to a displayed position that is different than the player's participant's current position.

After enabling the player to designate which displayed position the player wants their participant to move to, the gaming system moves the player's participant to the designated position and determines if any award is associated with the moved-to position as indicated in block 118 and diamond 120.

If an award is associated with the moved-to position, the gaming system provides the player the associated award as indicated in block 122. For example, if an award of five-hundred credits is associated with the player's participant's currently moved to position, the gaming system displays to the player (and zero, one or more other players or bystanders either at a gaming establishment or viewing over a network, such as the internet) the player's participant winning this five-hundred credit award.

After providing the player any associated award or if no award is associated with the moved-to position, the gaming system determines if any award opportunity is associated with the moved-to position as indicated in diamond 124. If an award opportunity is associated with the moved-to position, the gaming system enables the player to participate in the associated opportunity to win an award as indicated in block 126. For example, if a selection game is associated with the player's participant's moved-to position, the gaming system enables the player to play the associated selection game to determine any award for the play of the selection game. In this example, if the player picks a selection associated with a value of one-hundred credits, the gaming system displays to the player (and zero, one or more other players or bystanders either at a gaming establishment or viewing over a network, such as the internet) the player's participant winning this one-hundred credit award.

After providing the player any award determined for any associated award opportunity or determining that no award opportunity is associated with the player's participant's moved-to position, the gaming system determines if the player has at least one move remaining to redeem as indicated in diamond 128. If the player has at least one move remaining to redeem, the gaming system returns to block 116 and again enables the player to designate which displayed position the player wants their participant to move to. On the other hand, if the player has no moves remaining to redeem, the gaming system returns to block 102 and again enables the player to place a wager on a play of the primary game. That is, when the player has no moves remaining, the gaming system concludes the player's current movement throughout the redemption area and returns to the primary game. In one embodiment, as long as the player remains playing the primary game, the player's participant remains in the redemption area. In another embodiment, after using any provided position moves, the player's participant is removed from the redemption area until the player is provided one or more additional position moves.

In one embodiment, the gaming system causes at least one display device of the player's gaming device to display the community game. In another embodiment, in addition or in alternative to each gaming device displaying the community game, the gaming system causes one or more community or overhead display devices to display part or all of the community game to one or more other players or bystanders either at a gaming establishment or viewing over a network, such as the internet. In another embodiment, in addition or in alternative to each gaming device displaying the community game, the gaming system causes one or more internet sites to each display the community game such that a player is enabled to log on from a personal web browser to view at least their participant's location in the redemption area. In another such embodiment, the gaming system enables the player to play one or more primary games on one device while viewing the community game from another device. For example, the gaming system enables the player to play one or more primary games on a mobile phone while viewing the status of the community game on a PC desktop or laptop computer. In this example, the gaming system enables the player to control their participant from the mobile phone if a community game position move accumulation event occurs. In one such example, the gaming system enables the player to navigate their participant over a smaller complete version of the redemption area displayed on the mobile phone. In another such example, the gaming system enables the player to only view a portion of the redemption area on the mobile phone while simultaneously viewing the entire redemption area on the PC desktop or laptop computer. In these embodiments, the gaming system enables one or more players currently playing one or more wagering games to participate in the community game with one or more players currently playing one or more non-wagering games.

In one embodiment, the community game is a persistent or continuing community game, such as an ongoing community game. That is, the community game is continuously being played by zero, one or more players and continuously displayed to zero, one or more players (or bystanders either at a gaming establishment or viewing over a network, such as the internet). In this embodiment, the gaming system initially displays or presents the player's participant at one of a plurality of positions of the redemption area of the community game. It should be appreciated that in this ongoing community game embodiment, the display of the player's participant at one of the positions occurs prior to any event which provides the player a quantity of position moves and/or a quantity of community game award populators to utilize in the ongoing community game. That is, even before the player has gained entry to play this ongoing community game (i.e., the make one or more position moves and/or to place one or more community game award populators), the player's participant is actively involved in the ongoing community game.

In another embodiment, the community game is not a persistent or continuing community game. Rather, the gaming system triggers a play of the community game after an occurrence of a community game triggering event. In this embodiment, following the triggering of a play of the community game, the gaming system displays or presents the player's participant at one of a plurality of positions of the redemption area of the community game. In different embodiments, any suitable triggering event which occurs in association with zero, one or more different players of the gaming devices of the gaming system (e.g., the gaming system providing the player a quantity of position moves and/or a quantity of community game award populators) may cause a triggering of a play of the community game.

Participation in Community Game

In various embodiments, the players for the community game include one or more of: (i) players playing gaming devices at a gaming establishment, (ii) players playing wagering games online or via a mobile device, (iii) players playing non-wagering games online or via a mobile device. In one embodiment, each participant displayed or presented in the redemption area of the community game is associated with a player playing the community game either at a gaming establishment or remotely via a network (i.e., over the internet). In another embodiment, one or more participants displayed or presented in the redemption area of the community game are internet gaming bots programmed to play the community game. In one such embodiment, the gaming system utilizes such bots to populate the redemption area with participants when the quantity of participants associated with players is below a threshold quantity. In another such embodiment, the gaming system utilizes such bots to compete with participants associated with players to accumulate any community game awards/award opportunities associated with the positions of the redemption area. In another such embodiment, the moves these bots make during the community game are based on one or more player's moves in one or more previous plays of the community game.

In one embodiment, a player's participant functions as a messenger which conveys information about the player to any other player (or bystander) currently monitoring the community game. That is, unlike certain known community games in which a player is only able to view what that player wins (and is unable to see what other player's win), a player's participant of the present disclosure enables other players (or bystanders of the community game) to view how and what a player wins. In one embodiment, a player's participant conveys information not only about a player's awards obtained in the community game, but also about a player's awards obtained during that player's play of a primary game. For example, when player gets a significant win in the primary game, this win is celebrated and advertised by that player's participant such as by presenting appropriate messages to the player visually, or through suitable audio or audiovisual displays. Such announcements give other players an indication of a winning gaming experience and emulates a casino experience at a bank of machines.

In one embodiment, upon an occurrence of a community game enrollment event, the gaming system determines whether the player has previously enrolled to participate in the community game. In one such embodiment, a community game enrollment event occurs when a player submits (such as inserting) a player tracking card or inputs other identification into the gaming device. In another such embodiment, a community game enrollment event occurs when a player places a wager on a play of a primary game. In another such embodiment, a community game enrollment event occurs when a player begins play at a dedicated account based gaming machine that is configured to play with a specific player.

In one embodiment, if the player has not previously enrolled to participate in the community game, the gaming system enables the player to configure or select one or more characteristics or icons of the participant (e.g., an avatar) associated with that player. For example, in configuring a participant, the gaming system enables the player to select one or more of a gender, clothing, body characteristics or features, facial characteristics or features, and/or celebration sounds or catch-phrases. On the other hand, if the player has previously enrolled to participate in the community game, the gaming system accesses a previously configured participant associated with the player. In one such embodiment, if the player has obtained any virtual goods (from purchasing such virtual goods and/or winnings such virtual goods in association with one or more plays of one or more primary games and/or bonus games), the gaming system enables the player to modify their existing configured participant with such virtual goods.

In different embodiments, following the association of the player's participant with the community game (in an ongoing community game embodiment) or following the occurrence of a community game triggering event (in a non-ongoing community game embodiment) or alternatively following the occurrence of a community game position move accumulation event (in a non-ongoing community game embodiment), the gaming system displays the player's participant at one of the plurality of positions of the redemption area of the community game.

In one embodiment, the gaming system randomly places the player's participant at an empty or otherwise unoccupied position of the redemption area of the community game. In another embodiment, the gaming system places the player's participant at an empty or otherwise unoccupied position that has a predefined relationship with another player's participant, such as within ten positions of another player's participant. In another embodiment, the gaming system places the player's participant at an empty or otherwise unoccupied position that has a predefined relationship with an award or award opportunity associated with another one of the positions, such as no closer than five positions to a position associated with an award. In another embodiment, the gaming system displays or places the player's participant at a starting position of the redemption area (or at one of a plurality of different starting positions of the redemption area). In another embodiment, the gaming system displays or places the player's participant at one of a plurality of different starting positions. In another embodiment, if the player has previously entered the community game, the gaming system displays or places the player's participant at a previously visited position associated with a previous play of the community game (i.e., a player's participant's location persists over a plurality of gaming sessions). In one such embodiment, the gaming system utilizes one or more external communication services, such as the internet, to enable a player to inquire about the player's participant's previously visited location.

In one embodiment, the gaming system associates a plurality of participants or avatars with a player. In one embodiment, different players are associated with different quantities of participants based on one or more factors such as a player tracking status (e.g., platinum level players are associated with three participants, gold level players are associated with two participants and silver level players are associated with one participant) and/or a wager amount. In one such embodiment, when a player is provided a quantity of position moves, the gaming system enables the player to select which of the player's associated participants to move. In another such embodiment, when a player is provided a quantity of position moves, the gaming system enables the player to partition the quantity of position moves amongst one or more of the player's associated participants. In another such embodiment, when a player is provided a quantity of position moves, the gaming system enables each of the player's associated participants to move the provided quantity of position moves.

In one embodiment, in addition to configuring how a player's participant or avatar will look, the gaming system enables a player to select one or more features associated with the player's participant. In one embodiment, which of a plurality of different types of an available feature the player selects will affect the player's participant's success in the community game. For example, a first type of weapon or magic spell available to be selected by the player may work against a first kind of monster in the redemption area (but not against a second, different kind of monster) while a second type of weapon or magic spell available to be selected by the player may work against the second kind of monster in the redemption area (but not against the first kind of monster). In this example, the player's participant's chances of advancing in the community game may be based, at least in part, on which weapon or magic spell the player selected and which type of monster the player's participant encounters in the community game. In another embodiment, which of a plurality of different available features the player selects will affect the player's participant's success in the community game. For example, the gaming system enables the player to select between having advanced weaponry (combined with non-advanced armor) or having advanced armor (combined with non-advanced weaponry). In this example, the player's participant's chances of advancing in the community game may be based, at least in part, on whether the player's participant requires more advanced weaponry or more advanced armor.

In one embodiment, the gaming system causes the player's participant to change or evolve as the player's participant moves throughout the redemption area of the community game. For example, the gaming system enables the player's participant to collect or upgrade certain features and downgrade certain other features. In another embodiment, the gaming system causes the player's participant to change or evolve based on one or more side wagers placed or other consideration provided by the player.

In one embodiment, the gaming system enables a player that is enrolled in the community game to unenroll or opt-out of the community game. In different embodiments, the gaming system enables a player to opt-out of the community game at a designated time, upon the player selecting to opt-out from the community game, upon a designated event occurring (such as the player's credit meter falling below a threshold) or upon any suitable occurrence. In different embodiments, if the player opts-out of community game, the gaming system enables the player to save or retain the player's participant, the player's participant's current location in the redemption area and/or one or more of any accumulated moves to be used in the redemption area. In another such embodiment, if the player opts-out of the community game, the gaming system causes the player to forfeit the player's participant, the player's participant's current location in the redemption area and/or any accumulated moves to be used in the redemption area.

In one embodiment, the gaming system establishes a gaming device account for participation in the community game. In such embodiments, either a player or a gaming establishment operator can elect for a gaming device to participate in the community game, wherein if the gaming device is determined to participate in the community game, the gaming system establishes an account (or otherwise accesses a previously established account) for the gaming device. It should be appreciated that in this embodiment, the participant and any data associated with the participant are stored in an account associated with the gaming device and are not specific to the player that is playing that gaming device at any particular point in time.

In another embodiment, as mentioned above, the gaming system disclosed herein can be implemented in a networked environment, such as over the Internet. In an Internet embodiment, the gaming system disclosed herein is implemented using one or more servers, and individual users that access the servers (and participate in the ongoing community game) by logging on from a personal web browser or mobile device (e.g., a smart phone running an Internet-enabled application). In one such embodiment, while in a physical gaming establishment, a player's participant moves throughout one or more redemption areas obtaining zero, one or more community awards for the player. In this embodiment, when the player is subsequently remote from the physical gaming establishment and accesses the ongoing community game, the player's participant remains moving throughout one or more of the redemption areas. Thus, when the player returns to the physical gaming establishment, the player's participant may be located at a different position (from the player's last visit to the physical gaming establishment) which may be closer to or further away from one or more displayed positions having one or more lucrative awards or award opportunities. Such an embodiment provides that a player's actions both at the physical gaming establishment and remote from the physical gaming establishment affect the player's play of the community game and thus may affect the awards provided to the player in association with the community game.

In one such embodiment, the gaming system employs a remote user interface (such as a website accessible via a data network such as an internet). In this embodiment, the gaming system enables users (i.e., players that are remote from any gaming establishment) to make a plurality of different inputs to modify a plurality of different characteristics or features associated with their participant. In one embodiment, the gaming system determines whether to accumulate any community game moves for a participant based on any inputs made by a user to modify one or more of the characteristics or features associated with the users participant.

In one embodiment, the gaming system also enables users to associate their participants with one or more redemption areas via the remote user interface. In one embodiment, if a participant associated with a user is eligible to move throughout a redemption area, such as a recently added redemption area, the gaming system enables the user to enter or otherwise associate their participant with that redemption area by making one or more inputs via the remote user interface.

In addition to utilizing the remote user interface to cause the gaming system to accumulate any community game moves for a participant, the gaming system also enables users to interact with one another via the remote user interface. For example, users can interact with one another through elements such as a plurality of different discussion forums. In one embodiment, users utilize these different discussion forums to discuss redemption areas and topics relating to their participants. In one embodiment, users utilize these discussion forums and other various remote user interface options to buy, sell and trade attributes of their participants.

Additionally, the gaming system enables users to monitor a plurality of different statistics and attributes associated with their participant via the remote user interface. For example, users can view statistics associated with their participant, including but not limited to: current participant power, current participant eligibility for different redemption areas, and previous redemption areas and/or displayed positions visited by their participant.

Community Game Award Populators

In one embodiment, to account for different players placing different wager amounts on the plays of the primary games of the gaming devices, the award and/or award opportunity associated with each provided community game award populator is based, at least in part, on the wager amount placed on the play of the primary game associated with the occurrence of the community game award populator event. For example, the gaming system provides a player a first community game populator associated with a first award value in response to an occurrence of a community game award populator event associated with a first play of a primary game at a first wager amount. In this example, the gaming system provides the player a second community game populator associated with a second, higher award value in response to an occurrence of a community game award populator event associated with a second play of the primary game at a second, higher wager amount. In another example, the gaming system provides a player a first community game populator associated with a first award opportunity having a first average expected award value (e.g., a first quantity of plays of a bonus game) in response to an occurrence of a community game award populator event associated with a first play of a primary game at a first wager amount. In this example, the gaming system provides the player a second community game populator associated with a second award opportunity having a second, higher average expected award value (i.e., a second, higher quantity of plays of the bonus game) in response to an occurrence of a community game award populator event associated with a second play of the primary game at a second, higher wager amount.

It should be appreciated that in certain embodiments the award value/average expected award value associated with each community game populator is based on the wager amount of the player playing the primary game associated with the occurrence of a community game award populator event (and not based on the wager amount of the player playing the primary game associated with the occurrence of a community game position move accumulation event). Such a configuration is one way to prevent players from colluding together wherein several low bet players play the primary game repeatedly earning community game populators and placing those community game populator in the redemption area near the participant of another colluding player who is placing large bets.

In another embodiment, the quantity of community game award populators provided to a player is based on the wager amount of the player playing the primary game associated with the occurrence of a community game award populator event. In another embodiment, the quantity of community game award populators provided to a player is based on the award amount of the primary game associated with the occurrence of a community game award populator event. In one such embodiment wherein the quantity of community game populators provided is based on a wager amount and/or a primary game award amount, the award value/average expected award value associated with a plurality of the community game populators is the same (or within the same range). In another such embodiment wherein the quantity of community game populators provided is based on a wager amount and/or a primary game award amount, the award value/average expected award value associated with each community game populator is the same (or within the same range). In another such embodiment wherein the quantity of community game populators provided is based on a wager amount and/or a primary game award amount, the award value/average expected award value associated with a plurality of the community game populators are different. In another such embodiment wherein the quantity of community game populators provided is based on a wager amount and/or a primary game award amount, the award value/average expected award value associated with each of the community game populators is different.

In another embodiment, different community game award populators correspond to different quantities of positions of the redemption area. In this embodiment, community game award populators that are associated with relatively higher valued awards/award opportunities correspond to a higher quantity of positions of the redemption area than community game award populators that are associated with relatively lower valued awards/award opportunities. Put differently, a community game award populator associated with a relatively higher valued award/award opportunity will take up more space when placed in the redemption area (i.e., occupy more positions) than a community game award populator associated with a relatively lower valued award/award opportunity. For example, as seen in FIG. 2C, the community game award populator associated with a community game award of one-hundred credits occupies one position in the redemption area while the community game award populator associated with a community game award opportunity of twenty free spins of a first game (having an average expected value of five-hundred credits) occupies six positions in the redemption area. Such a configuration provides players with an interesting choice to either keep any open positions around their associated participant in hope of being able to place a larger sized community game award populator (associated with a relatively higher valued award/award opportunity) near their associated participant, or to fill up any open positions around their associated participant with a plurality of community game award populators associated with relatively lower valued awards/award opportunities.

In another embodiment, certain community game award populators are associated with designated entrances which a player's participant must pass through to be provided the community game award/award opportunity associated with that community game award populator. For example, if a community game award opportunity is illustrated as a building in the redemption area, this illustrated building includes only one or two entrances (illustrated as the arrows in FIG. 2C) through which the player must maneuver their participant to accumulate that particular community game award opportunity. In this example, being provided a community game award opportunity is harder than simply picking up an item as in certain known gaming systems.

In one such embodiment which includes community game award opportunities displayed as community game buildings with at least two entrances, if at least two participants simultaneously enter the community game building (or simultaneously occupy the community game building), the gaming system causes each of the participants to participate in the community game award opportunity. In another such embodiment, a community game building may only be entered and/or occupied by one participant at a time wherein when that participant is finished participating in the community game award opportunity associated with the community game building, the gaming system causes the community game building to disappear (leaving the player's participant at the same displayed position). In another such embodiment, when a participant enters a community game building, the gaming system automatically finishes that participant's turn (regardless of how many position moves the participant has remaining). In another such embodiment, the gaming system enables a participant to continue using their remaining position moves after completing the community game award opportunity of the entered community game building.

In one embodiment, the gaming system imposes one or more restrictions on the placement of community game award populators in the redemption area. Such restrictions include, but are not limited to: a designated quantity of time to enable the player to place a community game award populator at a displayed position in the redemption area (wherein the community game award populator is randomly placed at a displayed position after the designated quantity of time), limiting the player to placing the community game award populator relative to the displayed position of the current position of the player's participant (e.g., a community game award populator is limited to being placed within X positions of the player's participant or is limited to being placed no closer than Y positions of the player's participant), limiting the player to placing the community game award populator relative to the position of another participant (e.g., a community game award populator is limited to being placed within X positions of another participant or is limited to being placed no closer than Y positions of another participant), limiting the player to placing the community game award populator relative to another placed community game award populator (e.g., a community game award populator is limited to being placed within X positions of another community game award populator or is limited to being placed no closer than Y positions of another community game award populator), limiting the player to placing the community game award populator relative to the community game award/award opportunity associated with another placed community game award populator (e.g., a community game award populator associated with a community game award/award opportunity is limited to being placed within X positions of another community game award populator associated with the same or a different community game award/award opportunity or is limited to being placed no closer than Y positions of another community game award populator associated with the same or a different community game award/award opportunity), limiting the player to placing the community game award populator based on the quantity of community game award populator placed (e.g., a player is provided a plurality of community game award populators and is limited to placing each of the provided community game award populators within a designated area of each other or a player is provided a plurality of community game award populators and is prohibited form placing each of the provided community game award populators within a designated area of each other).

In one embodiment, once a community game award populator is placed at a displayed position, the community game award/award opportunity associated with the placed community game award populator remains at that displayed position until it is accumulated or collected by a participant. In another embodiment, certain community game award populators are associated with a designated amount of time. In this embodiment, once a community game award populator is placed at a displayed position, the community game award/award opportunity associated with the placed community game award populator remains at that displayed position until the earlier of it being accumulated or collected by a participant or the designated amount of time expiring.

In one embodiment, prior to any placement of any community game award populators, none of the displayed positions are associated with any of the community game awards disclosed herein or any of the community game award opportunities disclosed herein or any of the community game outcomes disclosed herein. In another embodiment, prior to any placement of any community game award populators, at least one of the displayed positions is associated with at least one community game award, at least one community game award opportunity or at least one community game outcome. This embodiment is configured such that players that are playing the community game do not encounter an empty redemption area but rather encounter a redemption area with one or more awards/award opportunities.

In one embodiment, a plurality of the award opportunities associated with a plurality of the community game award populators have different average expected payouts. In another embodiment, a plurality of the award opportunities associated with a plurality of the community game award populators have the same average expected payout. In another embodiment, a plurality of the award opportunities associated with a plurality of the community game award populators are each associated with a different range of awards available to be provided to the player. In another embodiment, a plurality of the award opportunities associated with a plurality of the community game award populators are each associated with the same range of awards available to be provided to the player. In these embodiments, different displayed community game award populators are associated with different award opportunities having different volatilities such that a participant's movement to a displayed position coupled to a placed community game award populator determines the volatility of at least a portion of the player's community game experience.

In different embodiments, one or more of the community game awards associated with one or more of the community game award populators include, but are not limited to: credit amounts, modifiers (e.g., multipliers), physical prizes, free spins, progressive awards, a value, virtual goods associated with the gaming system, virtual goods not associated with the gaming system, and a modifier.

In different embodiments, one or more of the community game award opportunities associated with one or more of the community game award populators include, but are not limited to: a play of any suitable slot game, a play of any suitable free spins or free activations game, a play of any suitable wheel game, a play of any suitable card game, a play of any suitable offer and acceptance game, a play of any suitable award ladder game, a play of any suitable puzzle-type game, a play of any suitable persistence game, a play of any suitable selection game, a play of any suitable cascading symbols game, a play of any suitable ways to win game, a play of any suitable scatter pay game, a play of any suitable coin-pusher game, a play of any suitable elimination game, a play of any suitable stacked wilds game, a play of any suitable trail game, a play of any suitable bingo game, a play of any suitable video scratch-off game, a play of any suitable pick-until-complete game, a play of any suitable shooting simulation game, a play of any suitable racing game, a play of any suitable promotional game, a play of any suitable high-low game, a play of any suitable lottery game, a play of any suitable number selection game, a play of any suitable dice game, a play of any suitable skill game, a play of any suitable auction game, a play of any suitable reverse-auction game, a play of any suitable group game or a play of any other suitable type of game.

In another embodiment, one or more of the community game award populators are each associated with a community game outcome. In this embodiment, the community game outcomes include, but are not limited to: Nx multipliers on the player's participant's next M moves, one or more additional entrances to associate with one or more community game award opportunities, one or more blockades to place at one or more displayed positions (which prevent another player's participant from reaching a particular community game award/award opportunity), the ability of a player's participant to destroy one or more temporary blockades, the ability of a player's participant to be temporarily magnetized such that all coins/chests within a designated quantity of positions of the player's participant are automatically accumulated or collected by the player's participant, position move incrementors (e.g., gain X number of moves upon a subsequent occurrence of a community game position move accumulation event, gain Y number of moves for each community game award/award opportunity accumulated, or gain an unlimited quantity of position moves provided until the player's participant accumulates or collects a designated quantity of community game awards/award opportunities), community game award modifiers (e.g., all community game awards provided are multiplied by a 2× multiplier); community game award populator movers (e.g., a placed community game award populator is relocated to another position and thus the associated community game award/award opportunity is relocated to the other position), position move decrementors (e.g., lose X number of moves on your next entry into the community game), anti-blockers (e.g., jump over or pass through a blocking participant) and participant movers (e.g., an outcome which causes one or more other participants to be relocated one or more positions), one or more free spin upgrades (such as additional wild symbols), one or more player status upgrades (such as leveling-up to a next achievement level), one or more entries for a future automated drawing, one or more entries for a live-action drawing, wild reels for one or more plays of a reel game, two way pays, extra free spins for a play of a reel game, do-overs, no-win respins (e.g., respins a losing outcome in a reel game), position transporters (e.g., moves the player's participant to another displayed position of the redemption area), award opportunity transporters (e.g., changes the award opportunity for the player), accumulators (e.g., collect X number of accumulator symbols and win a progressive award). In another embodiment, certain of the community game award populators are associated with penalty community game outcomes, such as, but not limited to: a lose a move penalty, a lose x multipliers penalty, a lose y free activations or spins penalty, a lose z amount of credits collected so far penalty, a move back n positions penalty, and/or a move back to a start position penalty.

In one embodiment, the magnitude of the community game award, community game award opportunity or community game outcome changes based on which portion of the redemption area which the community game award populators is placed. For example, community game award populators placed further from the starting positions of the redemption area will, on average, be associated with higher value awards. In another embodiment, the award values associated with various community game award populators are variable. In one such embodiment, the value associated with a community game award populator increases each time a participant lands on a position (or passes by a position). In another such embodiment, the value associated with a community game award populator decreases each time a participant lands on a position (or passes by that position). It should be appreciated that different disclosed community game award populators features can be simultaneously employed for one or more of the community game award populators placed in the redemption area.

Redemption Area

In one embodiment, the community game includes one redemption area which is formed from a plurality of displayed positions. In different embodiments, the plurality of displayed positions of the redemption area form a orthogonal layout, a non-orthogonal layout or any other suitable layout. In different embodiments, the plurality of displayed positions of the redemption area are displayed to occupy a two-dimensional space, a three-dimensional space or any combination of two-dimensional and three-dimensional spaces. In another embodiment, the community game includes a plurality of redemption areas which are each formed from a plurality of displayed positions. In these embodiments, the displayed positions of each redemption area are connected to one another, such that each displayed position is adjacent to at least one other displayed position and a plurality of displayed positions are each adjacent to a plurality of other displayed positions (e.g., a grid of positions). In such embodiments, the displayed positions and/or plurality of redemption areas are connected to each other by one or more trails, paths, roads. In another embodiment including a plurality of redemption areas, two or more different redemption areas include different characteristics, such as different sizes, different shapes, different walls and/or different terrains. In different embodiments, one or more of the characteristics of such redemption area are static and/or change over time.

In one embodiment including a plurality of redemption areas, the gaming system enables a player to select which of the plurality of redemption areas they want their participant initially displayed in. In another embodiment, the gaming system selects which of the plurality of redemption areas to initially display each participant at. In one embodiment, the gaming system requires a player to earn access to one or more redemption areas (i.e., certain redemption areas are available to all players and certain redemption areas are available to designated players). In one embodiment, the gaming system enables a player to select when they want their participant to switch from one redemption area to another redemption area. In another embodiment, the gaming system causes a player's participant to randomly switch from one redemption area to another redemption area.

In one embodiment, the gaming system displays to the players (and to any bystanders either at a gaming establishment or viewing over a network, such as the internet) the awards and/or award opportunities associated with the community game award populators placed at the displayed positions. In another embodiment, the gaming system displays to the players (and to any bystanders either at a gaming establishment or viewing over a network, such as the internet) information or hints regarding the awards and/or award opportunities associated with community game award populators placed at the displayed positions. In these embodiments, if a player is aware that their associated participant is near a displayed position associated with a lucrative award (or a lucrative award opportunity), the player may increase their rate of play in attempt to move their participant even closer to such displayed positions. That is, in certain situations, a player may alter their play of the primary game in response to the current configuration or status of the community game.

In another embodiment, the gaming system does not display to any players (and to any bystanders either at a gaming establishment or viewing over a network, such as the internet) the awards and/or award opportunities associated with the community game award populators placed at the displayed positions. In another embodiment, the gaming system displays to the players (and to any bystanders either at a gaming establishment or viewing over a network, such as the internet) the awards and/or award opportunities associated with certain of the community game award populators placed at the displayed positions and does not display to any players (and to any bystanders either at a gaming establishment or viewing over a network, such as the internet) the awards and/or award opportunities associated with certain others of the community game award populators placed at the displayed positions.

In one embodiment, only one participant may be located at a displayed position at any point in time. In another embodiment, a plurality of participants may each be located at the same displayed position at a point in time. In certain such embodiments, each player associated with each participant located at the same displayed position is: (i) provided any award associated with the displayed position, or (ii) individually participates in any award opportunity associated with the displayed position. In another certain other embodiments, each player associated with each participant located at the same displayed position is provided: (i) a portion of any award associated with the displayed position, or (ii) participates with the other players in any award opportunity associated with the displayed position (i.e., a group award opportunity).

In another embodiment, the gaming system associates one or more additional features with the redemption area. In one such embodiment, the gaming system associates one or more of the displayed positions with a portal (which enable a participant to teleport from one location to another). In another such embodiment, the gaming system associates one or more of the displayed positions with an impassable wall which prevents a participant from moving through that displayed position (or prevents the participant from moving through that displayed position along certain paths). In another such embodiment, the gaming system associates one or more of the displayed positions with hidden community game awards/award opportunities (which are provided to any player's participant that moves to such displayed positions). In this embodiment, such hidden community game awards/award opportunities are utilizes to boost the payout to certain players that move their participant the wrong way and would not otherwise be provided an award. In another such embodiment, the gaming system causes one or more move blockers (e.g., one or more monsters which a participant may not pass) to move throughout the redemption area.

In another embodiment, the gaming system enables a player to access one or more maps of the redemption area. In one such embodiment, the gaming system enables the player to utilize the map to initially place their player participant in the redemption area. In another such embodiment, the gaming system enables the player to utilize the map to determine which previously visited positions are associated with which awards. This embodiment enables the player to incorporate an element of strategy in moving their participant around the redemption area.

Participant Movements

In another embodiment, the gaming system determines one or more destination positions available for the player to select to move their participant to. In different such embodiments, the determined destination positions are independent of the current position of the player's participant and/or independent of the quantity of position moves provided to the player.

That is, in these embodiments, rather than enabling a player to move their participant to one or more adjacent positions (or one or more positions located within a designated distance of the player's participant's current position), the gaming system determines, regardless of the player's participant's current position, one or more destination positions (in one or more redemption areas) and enables the player to select one of these determined destination positions to move their participant to. In another embodiment, the gaming system randomly select which destination position the player's participant will move to. In one such embodiment, the gaming system randomly selects a plurality of destination positions and the player selects which of these randomly selected destination positions their participant will move to. In another such embodiment, the player selects a plurality of destination positions and the gaming system randomly selects which of these player selected destination positions the player's participant will move to.

In one embodiment, for a provided move, if the player does not select a position as the destination position for that move within a designated period of time, the gaming system selects a position as the destination position for the player based on one or more pre-defined rules. In another embodiment, for a provided move, if the player does not select a position as the designated position for that move, the gaming system causes the player to forfeit that provided move. In another embodiment, for a provided move, if the player does not select a position as the designated position for that move, the gaming system converts the provided move to an award for the player. In another embodiment, for a provided move, if the player does not select a position as the destination position for that move, the gaming system saves that position move and enables the player to subsequently use the saved position move within the triggered community game. In another embodiment, for a provided move, if the player does not select a position as the destination position for that move, the gaming system saves that position move and enables the player to subsequently use the saved position move within a subsequently triggered community game.

In one embodiment, the gaming system imposes one or more limitations relating to enabling the player to pick a destination position for their participant. In different embodiments, these limitations include, but are not limited to: a participant may not pass through a wall of a community game award opportunity presented as a bonus building; a participant may not pass through another participant and a participant may pass through another participant, but may not finish a final move on the same position as another participant.

In another embodiment, the gaming system enables the player to specify a maximum distance to move. In this embodiment, the gaming system enables the player to specify an endpoint of the move (and not the entire path) to enable a "knight's move" style of play, wherein the player's piece moves from one location to another without passing through any points in between, or collecting any awards in between. For example, when used in a more free-form landscape (i.e., the redemption area includes a landscape different than a tessellated grid) such an embodiment provides an increased level of decision making for the player.

In one embodiment, the gaming system enables a player to cause the participant associated with a different player to move to a different displayed position. In one such embodiment, if another player's participant is already occupying a displayed position in the redemption area, the gaming system enables the player to cause the other player's participant to move such that the player's participant may move to that displayed position. In these embodiments, one player's actions affect another player's involvement in the community game and may affect the awards and/or award opportunities available to the other player. In another embodiment, the gaming system enables players to trade or swap the positions of their respective participants. In one such embodiment, the gaming system enables a first player to sell, such as for money or other suitable game currency, the position associated with their participant to a second player associated with a participant at a different location.

In one embodiment, as described herein, the gaming system provides the player a quantity of position moves to move their associated participant throughout the redemption area. This configuration of providing a quantity of moves to utilize in the community game ensures that certain, quicker players are not given a distinct advantage over other players as in certain known community games which provide players an amount of time to move in the community game. In another embodiment, the gaming system provides the player a quantity of time to move their associated participant throughout the redemption area. In one such embodiment, different participants are associated with different rates of movement (i.e., how quickly those participants will move from displayed position to displayed position).

In another embodiment, the gaming system enables one or more players to buy or purchase one or more position moves throughout the redemption. In another embodiment, the gaming system enables one or more players to sell one or more accumulated position moves throughout the redemption. In different embodiments, the gaming system enables such players to buy or sell such position moves for monetary credits, non-monetary credits, promotional credits, player tracking points or any additional currency. In another embodiment, the gaming system enables one or more players to trade one or more position moves throughout the redemption.

Alternative Embodiments

In another embodiment, the gaming system provides the player an event occurrence rate modifier in association with one or more plays of the primary game. In one such embodiment, the gaming system enables the player to utilize the provided event occurrence rate modifier to increase the rate of occurrences community game award populator events while decreasing the rate of occurrences of community game position move accumulation events. In another such embodiment, the gaming system enables the player to utilize the provided event occurrence rate modifier to increase the rate of occurrences of community game position move accumulation events while decreasing the rate of occurrences of community game award populator events. In another such embodiment, the gaming system enables the player to utilize the provided event occurrence rate modifier to pick a rate of occurrences of community game award populator events. In another such embodiment, the gaming system enables the player to utilize the provided event occurrence rate modifier to pick a rate of occurrences of community game position move accumulation events. In different embodiments, the utilization of one or more provided event occurrence rate modifiers is available all of the time, only when a bonus is triggered, when a player achieves a certain status level, when the player places a designated bet size, or when the player is of a particular player tracking status.

It should be appreciated that in different embodiments, one or more of:

i. one or more characteristics of a player's participant;

ii. one or more features of a player's participant iii. which of a plurality of different positions a player's participant is initially positioned at;

iv. which of a plurality of different redemption areas a player's participant is initially positioned at;

v. one or more characteristics of one or more redemption areas;

vi. when a community game enrollment event occurs;

vii. when a community game position move accumulation event occurs;

viii. a quantity of moves to provide a player upon an occurrence of a community game position move accumulation event;

ix. a size or quantity of positions in a redemption area;

x. which of any awards are initially associated with which positions in a redemption area;

xi. which of any award opportunities are initially associated with which positions in a redemption area;

xii. when a community game award populator event occurs;

xiii. a quantity of community game award populators to provide a player upon an occurrence of a community game award populator event;

xiv. which community game award populators to provide a player upon an occurrence of a community game award populator event;

xv. which awards are associated with which community game award populators;

xvi. which award opportunities are associated with which community game award populators;

xvii. which game or games will be played in association with each award opportunity;

xviii. which outcomes are associated with which community game award populators;

xix. when to enable a player to save one or more community game position moves and/or one or more community game award populators;

xx. a duration which a player may save one or more community game position moves and/or one or more community game award populators;

xxi. a quantity of community game position moves and/or community game award populators a player may save at any point in time;

xxii. the determination of whether or not a player is provided the opportunity to participate in the community game;

xxiii. a quantity of participants associated with a player;

xxiv. a rate of movement of a participant throughout the redemption area;

xxv. a conversion rate which a player may buy, sell or trade one or more position moves with other players;

xxvi. any determination disclosed herein;

is/are predetermined, randomly determined, randomly determined based on one or more weighted percentages, determined based on a generated symbol or symbol combination, determined based on a random determination by the central controller, determined based on a random determination at the gaming system, determined based on at least one play of at least one game, determined based on a player's selection, determined based on one or more side wagers placed, determined based on the player's primary game wager, determined based on time (such as the time of day), determined based on an amount of coin-in accumulated in one or more pools, determined based on a status of the player (i.e., a player tracking status), or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 3A:
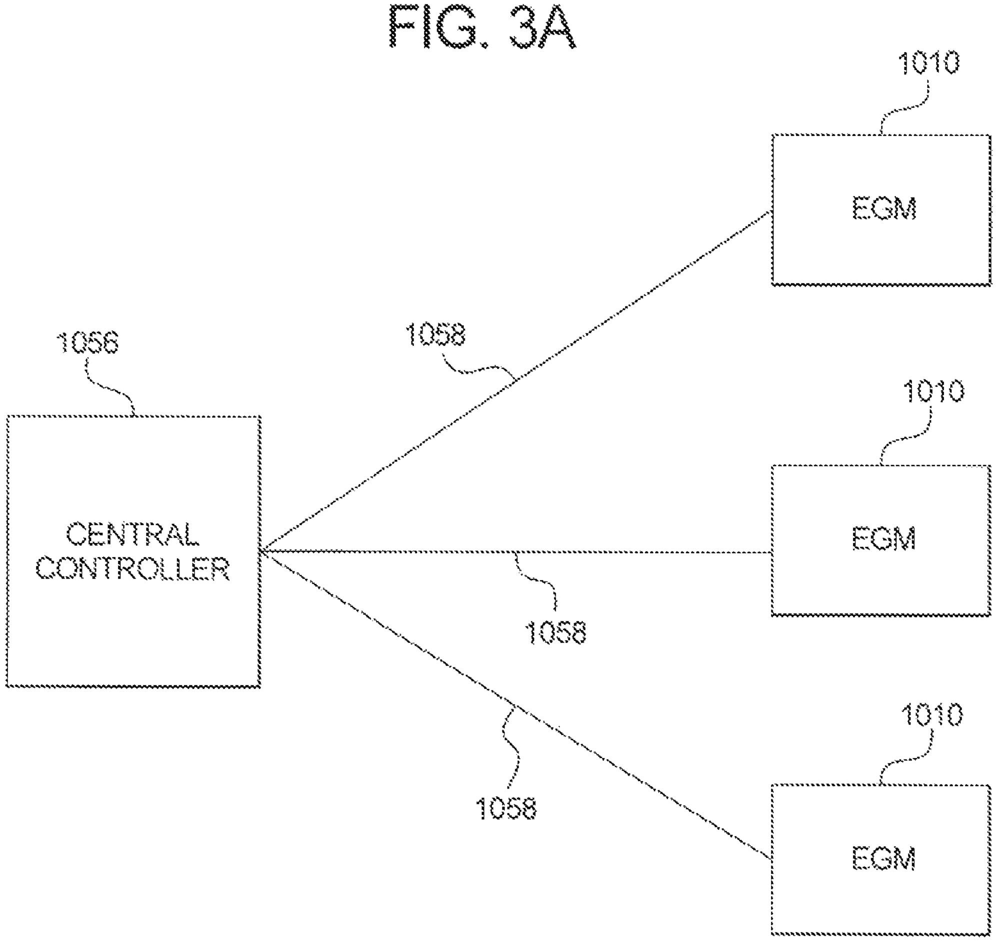
FIG. 3A is a schematic block diagram of one embodiment of a network configuration of the gaming system disclosed herein.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3B:
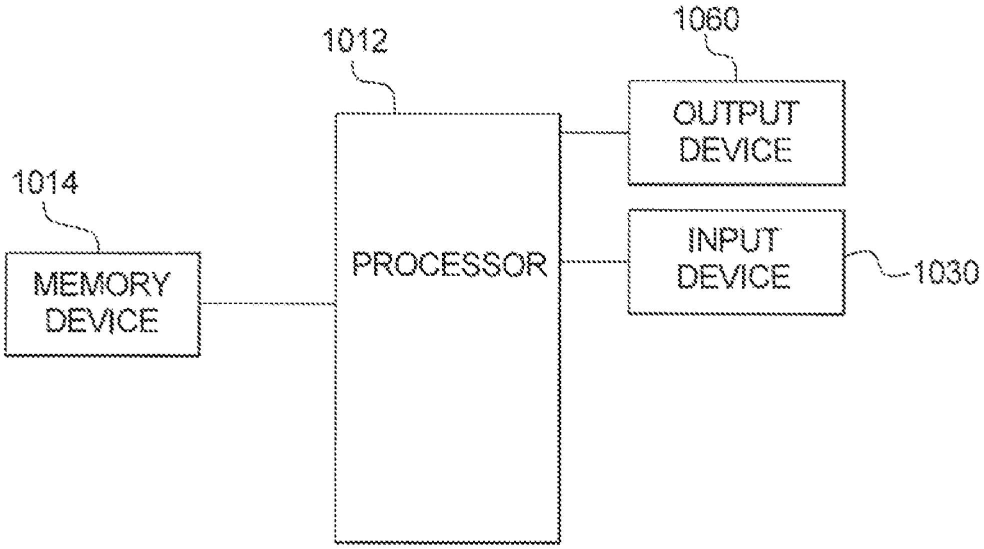
FIG. 3B is a schematic block diagram of one embodiment of an electronic configuration of the gaming system disclosed herein.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 3B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 4A:
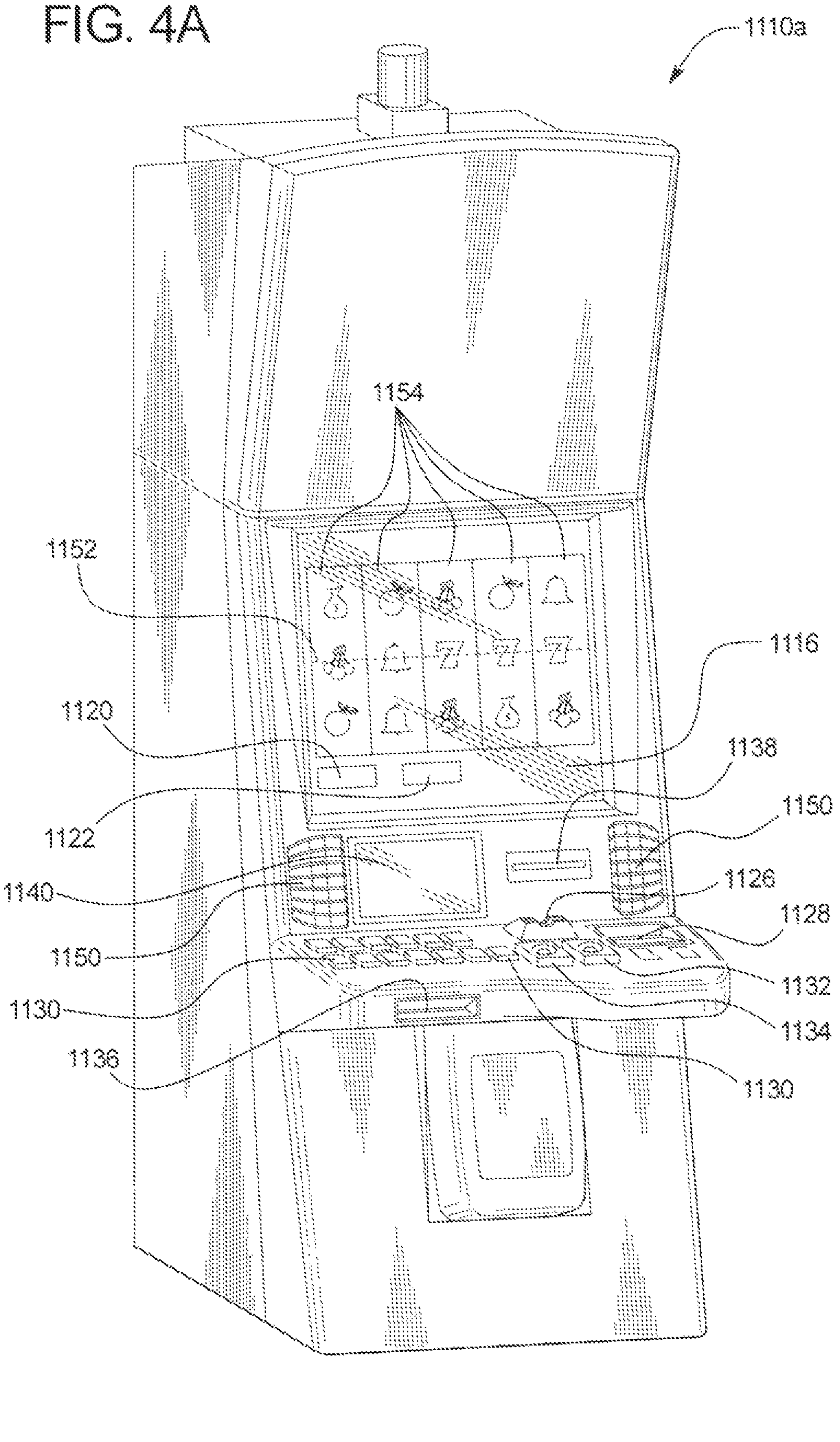
FIGS. 4A and 4B are perspective views of example alternative embodiments of the gaming system disclosed herein.
Figure 4B:
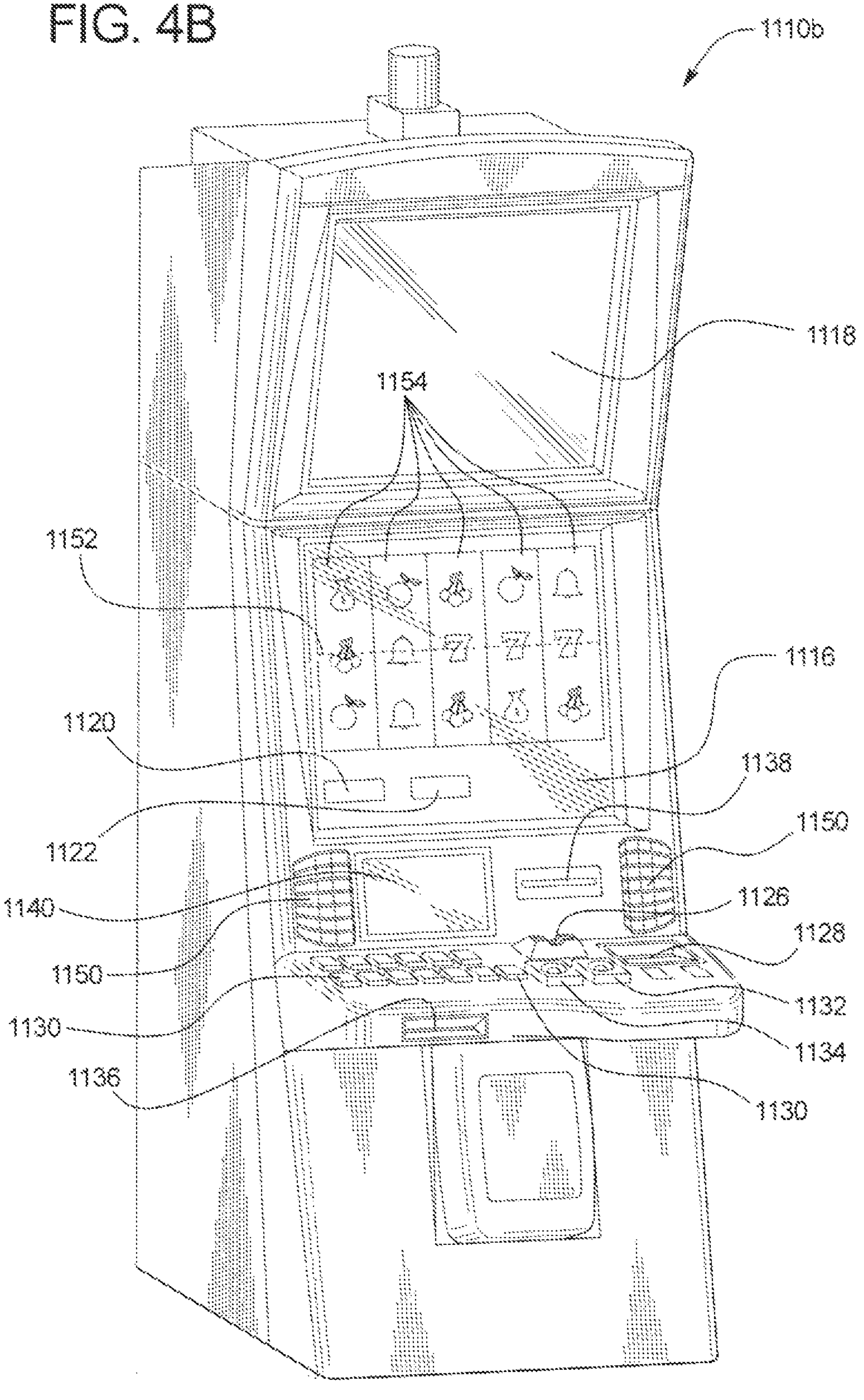

In various embodiments, the EGM includes one or more input devices. The input devices may include any suitable device that enables an input signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 4B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 4A and 4B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 4A and 4B each include a card reader 1138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 4A includes a central display device 1116, a player tracking display 1140, a credit display 1120, and a bet display 1122. The example EGM illustrated in FIG. 4B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 4A and 4B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 4A and 4B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 4A and 4B each include a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one controller configured to communicate with each of a plurality of gaming devices, each of the plurality of gaming devices configured to enable a player to place a wager to play a primary game wherein each player is associated with an individual participant, said at least one controller programmed to:

(a) for each of the players, if a community game award populator event occurs:

(i) provide the player a quantity of community game award populators, each community game award populator associated with one of: a community game award and a community game award opportunity, (ii) cause a display of:

(A) a community game matrix including a plurality of displayed positions, and (B) the individual participant associated with the player at one of the displayed positions, (iii) enable the player to place each provided community game award populator at at least one of the displayed positions, and (iv) for each community game award populator placed at at least one of the displayed positions, associate the one of the community game award and the community game award opportunity with the at least one displayed positions; and (b) if a community game position move accumulation event occurs:

(i) determine a quantity of position moves associated with one of the players, and (ii) for each of the determined quantity of position moves associated with the player:

(A) enable the player to designate one of the displayed positions, wherein the displayed positions available to be designated by the player are based on the position at which the individual participant associated with the player is displayed, (B) cause a display of the individual participant associated with the player moving to the designated displayed position, (C) if the designated displayed position is associated with any community game awards, cause the associated community game award to be provided to the player, and (D) if the designated displayed position is associated with any community game award opportunities:

(I) determine any community game award associated with the community game award opportunity, and (II) cause any determined community game award to be provided to the player.

2. The gaming system of claim 1, wherein the community game award populator event occurs based, at least in part, on at least one event occurring in association with at least one of the plays of the primary game.

3. The gaming system of claim 1, wherein the community game position move accumulation event occurs based, at least in part, on at least one event occurring in association with at least one of the plays of the primary game.

4. The gaming system of claim 1, wherein at least one of the community game award populators is associated with a first community game award opportunity having a first average expected payout and at least one of the community game award populators is associated with a second, different community game award opportunity having a second, different average expected payout.

5. The gaming system of claim 4, wherein the first community game award populator is associated with a first play of the primary game and the placement of a first wager amount and the second community game award populator is associated with a second play of the primary game and the placement of a second, different wager amount.

6. The gaming system of claim 1, wherein at least one of the placed community game award populators is associated with a plurality of the displayed positions.

7. The gaming system of claim 1, wherein the at least one controller is programmed to cause at least one community display device to display at least one of: the community game matrix including the plurality of displayed positions, at least one individual participant associated with at least one of the players, at least one of any community game awards provided to at least one of the players, and at least one of any community game award opportunities.

8. A gaming system comprising:

at least one controller configured to communicate with each of a plurality of gaming devices, each of the plurality of gaming devices configured to enable a player to place a wager to play a primary game wherein each player is associated with an individual participant, said at least one controller programmed to:

(a) if a community game award populator event occurs:

(i) cause a display of:

(A) a community game matrix including a plurality of displayed positions, and (B) the individual participant associated with at least one of the players at one of the displayed positions, and (ii) enable at least one of the players to place a community game award at at least one of the displayed positions; and (b) if a community game position move accumulation event occurs, for each of any accumulated position moves associated with one of the players:

(i) enable the player to designate one of the displayed positions, wherein the displayed positions available to be designated by the player are based on the position at which the individual participant associated with the player is displayed, (ii) cause a display of the individual participant associated with the player moving to the designated displayed position, (iii) if the designated displayed position is associated with any community game awards, cause the associated community game award to be provided to the player.

9. The gaming system of claim 8, wherein the community game award populator event occurs based, at least in part, on at least one event occurring in association with at least one of the plays of the primary game.

10. The gaming system of claim 8, wherein the community game position move accumulation event occurs based, at least in part, on at least one event occurring in association with at least one of the plays of the primary game.

11. The gaming system of claim 8, wherein at least one of the placed community game awards is associated with a plurality of the displayed positions.

12. The gaming system of claim 8, wherein the at least one controller is programmed to cause at least one community display device to display at least one of: the community game matrix including the plurality of displayed positions, at least one individual participant associated with at least one of the players, and at least one of any community game awards provided to at least one of the players.

13. A method of operating a gaming system, said method comprising:

(a) for each of a plurality of gaming devices, enabling a player to place a wager to play a primary game, each player being associated with an individual participant; and (b) for each of the players, if a community game award populator event occurs:

(i) providing the player a quantity of community game award populators, each community game award populator associated with one of: a community game award and a community game award opportunity, (ii) causing at least one display device to display:

(A) a community game matrix including a plurality of displayed positions, and (B) the individual participant associated with the player at one of the displayed positions, (iii) enabling the player to place each provided community game award populator at at least one of the displayed positions, and (iv) for each community game award populator placed at at least one of the displayed positions, causing at least one processor to execute a plurality of instructions to associate the one of the community game award and the community game award opportunity with the at least one displayed positions; and (c) if a community game position move accumulation event occurs:

(i) causing the at least one processor to execute the plurality of instructions to determine a quantity of position moves associated with one of the players, and (ii) for each of the determined quantity of position moves associated with the player:

(A) enabling the player to designate one of the displayed positions, wherein the displayed positions available to be designated by the player are based on the position at which the individual participant associated with the player is displayed, (B) causing the at least one display device to display the individual participant associated with the player moving to the designated displayed position, (C) if the designated displayed position is associated with any community game awards, providing the associated community game award to the player, and (D) if the designated displayed position is associated with any community game award opportunities:

(I) causing the at least one processor to execute the plurality of instructions to determine any community game award associated with the community game award opportunity, and (II) providing any determined community game award to the player.

14. The method of claim 13, wherein the community game award populator event occurs based, at least in part, on at least one event occurring in association with at least one of the plays of the primary game.

15. The method of claim 13, wherein the community game position move accumulation event occurs based, at least in part, on at least one event occurring in association with at least one of the plays of the primary game.

16. The method of claim 13, wherein at least one of the community game award populators is associated with a first community game award opportunity having a first average expected payout and at least one of the community game award populators is associated with a second, different community game award opportunity having a second, different average expected payout.

17. The method of claim 16, wherein the first community game award populator is associated with a first play of the primary game and the placement of a first wager amount and the second community game award populator is associated with a second play of the primary game and the placement of a second, different wager amount.

18. The method of claim 13, wherein at least one of the placed community game award populators is associated with a plurality of the displayed positions.

19. The method of claim 13, which includes causing at least one community display device to display at least one of: the community game matrix including the plurality of displayed positions, at least one individual participant associated with at least one of the players, at least one of any community game awards provided to at least one of the players, and at least one of any community game award opportunities.

20. The method of claim 13, which is provided through a data network.

21. The method of claim 20, wherein the data network is the internet.

22. A method of operating a gaming system, said method comprising:

(a) for each of a plurality of gaming devices, enabling a player to place a wager to play a primary game, each player being associated with an individual participant; and (b) if a community game award populator event occurs:

(i) causing at least one display device to display:

(A) a community game matrix including a plurality of displayed positions, and (B) the individual participant associated with at least one of the players at one of the displayed positions, and (ii) enabling at least one of the players to place a community game award at at least one of the displayed positions; and (c) if a community game position move accumulation event occurs, for each of any accumulated position moves associated with one of the players:

(i) enabling the player to designate one of the displayed positions, wherein the displayed positions available to be designated by the player are based on the position at which the individual participant associated with the player is displayed, (ii) causing the at least one display device to display the individual participant associated with the player moving to the designated displayed position, (iii) if the designated displayed position is associated with any community game awards, providing the associated community game award to the player.

23. The method of claim 22, wherein the community game award populator event occurs based, at least in part, on at least one event occurring in association with at least one of the plays of the primary game.

24. The method of claim 22, wherein the community game position move accumulation event occurs based, at least in part, on at least one event occurring in association with at least one of the plays of the primary game.

25. The method of claim 22, wherein at least one of the placed community game awards is associated with a plurality of the displayed positions.

26. The method of claim 22, which includes causing at least one community display device to display at least one of: the community game matrix including the plurality of displayed positions, at least one individual participant associated with at least one of the players, and at least one of any community game awards provided to at least one of the players.

27. The method of claim 22, which is provided through a data network.

28. The method of claim 27, wherein the data network is the internet.

* * * * *